(12) United States Patent
Kawashima et al.

(10) Patent No.: US 11,372,145 B2
(45) Date of Patent: Jun. 28, 2022

(54) OPTICAL ELEMENT AND OPTICAL CIRCUIT

(71) Applicants: AUTOCLONING TECHNOLOGY., LTD., Sendai (JP); PHOTONIC LATTICE, INC., Sendai (JP)

(72) Inventors: Takayuki Kawashima, Sendai (JP); Shojiro Kawakami, Sendai (JP); Toshikazu Ijiro, Sendai (JP); Takafumi Chiba, Sendai (JP)

(73) Assignee: Photonic Lattice, Inc., Miyagi (JP)

( * ) Notice: Subject to any disclaimer, the term of this patent is extended or adjusted under 35 U.S.C. 154(b) by 174 days.

(21) Appl. No.: 16/630,468

(22) PCT Filed: Jul. 13, 2018

(86) PCT No.: PCT/JP2018/026469
§ 371 (c)(1),
(2) Date: Jan. 13, 2020

(87) PCT Pub. No.: WO2019/013320
PCT Pub. Date: Jan. 17, 2019

(65) Prior Publication Data
US 2021/0088707 A1    Mar. 25, 2021

(30) Foreign Application Priority Data
Jul. 14, 2017   (JP) .............................. JP2017-138616

(51) Int. Cl.
*G02B 27/01* (2006.01)
*G02B 5/30* (2006.01)
*G02B 27/28* (2006.01)

(52) U.S. Cl.
CPC ........... *G02B 5/30* (2013.01); *G02B 27/0172* (2013.01); *G02B 27/283* (2013.01)

(58) Field of Classification Search
CPC ............ G02B 27/0101; G02B 27/0172; G02B 27/0905; G02B 27/0944; G02B 27/283;
(Continued)

(56) References Cited

U.S. PATENT DOCUMENTS

| 2007/0223932 | A1  | 9/2007 | Hsieh |
| 2015/0125109 | A1* | 5/2015 | Robbins ................. G02B 27/01 385/10 |
| 2016/0025914 | A1  | 1/2016 | Brongersma et al. |
| 2020/0033713 | A1* | 1/2020 | Ma ....................... G02B 5/0205 |

(Continued)

FOREIGN PATENT DOCUMENTS

| JP | 003325825 B   | 2/1998 |
| JP | 2011-018002 A | 7/2009 |

(Continued)

OTHER PUBLICATIONS

International Search Report of International Patent Application No. PCT/JP2018/026469 completed Sep. 27, 2018 and dated Oct. 9, 2018 (3 pages).

(Continued)

*Primary Examiner* — Sultan Chowdhury
(74) *Attorney, Agent, or Firm* — Pyprus Pte Ltd; George D. Liu

(57) ABSTRACT

An optical element has a quarter-wave plate formed on the X-Y plane and laminated in the Z-axis direction in three-dimensional space X, Y, Z. The groove in the wave plate is curved, and the angle relative to the Y-axis varies continuously in the range of 0° to 180°. The optical element separates and converts incoming circularly polarized light into light passing therethrough and circularly polarized light reversely rotating a given angle toward the X axis from the Z axis, and outputs the light.

13 Claims, 30 Drawing Sheets

(58) Field of Classification Search
CPC .......... G02B 27/286; G02B 5/08; G02B 5/30; G02B 5/1833; G02B 5/3025; G02B 5/3083; G02B 6/005; G02B 6/013; G02B 6/0053; G02B 6/0076; G02B 6/0088; G02B 6/278; G02B 6/2773; G03B 21/14; G03B 21/145; G03B 21/208; G03B 21/2073

See application file for complete search history.

(56) References Cited

U.S. PATENT DOCUMENTS

| | | | | |
|---|---|---|---|---|
| 2020/0081252 A1* | 3/2020 | Jamali | ................. | G02B 5/3083 |
| 2020/0132275 A1* | 4/2020 | Yamamoto | ........... | G11B 7/1362 |
| 2020/0207261 A1* | 7/2020 | Camras | ................. | G03B 21/14 |

FOREIGN PATENT DOCUMENTS

| | | |
|---|---|---|
| JP | 2012-181385 A | 9/2012 |
| JP | 2016-519327 A | 6/2016 |
| JP | 2017-72526 A | 4/2017 |

OTHER PUBLICATIONS

Written Opinion of International Patent Application No. PCT/JP2018/026469 completed Sep. 27, 2018 and dated Oct. 9, 2018 (3 pages).

D.Lin et al., "Dielectric Gradient Metasurface Optical Elements", Science, Applied Optics, Jul. 18, 2014, pp. 298-302.

N. Yu et al., "Flat Optics with Designer Metasurfaces", Nature Materials, Jan. 23, 2014, pp. 139-149.

Cristopher V. Poulton et al., "Coherent Solid-State LIDAR with Silicon Photonic Optical Phased Arrays", Optics Letters, vol. 42, No. 20, Oct. 15, 2017, pp. 4091-4094.

Notice of Reasons for Refusal for Japanese Patent Application No. 2019-529799 dated Mar. 17, 2021 (4 pages)

T. Ijiro et al, "Development of Polarization Beam Splitter Based on Auto-Cloning Photonic Crystal", Japan Society Applied Physics, Mar. 16, 2017.

\* cited by examiner

PITCH DEPENDENCE OF PHASE
DIFFERENCES ON SELF-CLONING

FRONT VIEW 3302
3304
3301
3303

TOP VIEW

3305

SIDE VIEW

3306

OPTICAL ELEMENT AND OPTICAL CIRCUIT

TECHNICAL FIELD

The present invention relates to an optical element configured to perform bending, separation, branching, joining, and an operation of redistribution of a light.

BACKGROUND ART

As the optical element configured to ensure bending, separation, branching, joining, and an operation of redistribution of a light, a lens, a prism, a half mirror, and the like are applied to extremely wide practical use. Since most of them have three-dimensional shapes like a convex lens and a concave lens, and are manufactured to each have one function, there are difficulties in integration and downsizing of them in some cases. Recently, there has been developed a technique (referred to as a gradient metasurface) where a micro treatment is performed to a surface of a transparent substrate, a wavefront is inclined by changing a phase of a light beam perpendicularly transmitting the transparent substrate for each position, thus operating propagation after the transmission.

It is not uncommon that the wavefront distortion amount necessary for that becomes several times or several tens of times of a wavelength. Meanwhile, since a practically applicable phase change amount of the light passing through the surface is about a fraction to several times of $2\pi$ radians, an operation to return the phase change amount to zero for every $2\pi$ radians like a sawtooth wave is required.

The aforementioned operation to return the phase change amount to zero for every $2\pi$ radians like a sawtooth wave cannot avoid light scattering at the proximity of its discontinuous point and errors in amplitude and phase due to the scattering. As a method to reduce it, the following means are known (Non-patent Document 1). That is,
(A) minute half waveplates having various directions by regions are gaplessly disposed on the substrate surface, and
(B) use of a property that the phase transition received when a circular polarized light passes through the region is equal to double of an angle $\theta$ of a principal axis with respect to a certain reference direction.

In detail, it has been known that when an electric field of an incident light in FIG. 1 is, for example, a circular polarized light obtained by $E_x = E_0 \cos(\omega t)$, and $E_y = E_0 \sin(\omega t)$, having $\xi\eta$ axes as FIG. 1 and inserting the half waveplates having the principal axes in the $\xi\eta$ axes directions makes the transmitted light a circular polarized light in a reverse direction to change a relative phase only by $2\theta$ (Non-patent Document 1).

When it is necessary to continuously change the phase transition exceeding $2\pi$ radians, it is only necessary to define $\theta$ like, for example, the upper side of FIG. 1 and continuously change $\theta$ exceeding $\pi$ radians, and changing $\theta$ continuously and monotonously by multiple times of $\pi$ ensures changing the phase angle by any times of $2\pi$ radians without discontinuities. Provisionally, when $\theta$ linearly increases or decreases approximately with x, the wavefront of the transmitting circular polarized light is linearly converted relative to x, thus generating a prism action.

The required "minute waveplate having various directions by regions" is achieved by periodically arranging deep grooves on the substrate. A row of the grooves of infinite length periodically formed on the solid surface generates a phase lag to a polarized light having the electric field parallel to the groove larger than that to a polarized light having the electric field perpendicular to the groove. It is necessary that the phase difference is matched to $\pi$ radians for the half waveplate, and for reasons of design or treatment, a distance between the grooves is often approximately from $\frac{1}{3}$ wavelength to $\frac{1}{2}$ wavelength but not $\frac{1}{4}$ wavelength.

Meanwhile, coherent systems are widely used in present optical communications.

In a small optical subsystem, such as an optical transceiver, the means for transmitting a light from transmission points $T_1, T_2, \ldots T_n$ to receiving points $R_1, R_2, \ldots R_m$ with branching and joining mainly includes
(1) Planar optical circuit (Planar lightwave circuit, PLC) (Patent Document 2), and
(2) Spatial optical system (Micro Optical Circuit, MOC) arranging individual components, such as a lens and a prism, on a spatially different position (Patent Document 3).

In the present invention, an operation to transmit a light with branching and joining is performed by an optical element group that has a signal distribution function between signal points on a plurality of planes $xy_1$, $xy_2$, $xy_3$, ... perpendicular to a direction (z-direction) in which the light is transmitted, a transmitting/receiving function, and a polarization separation function, and the optical element group has periodic structure axes in a plurality of directions.

For example, a PLC circuit that ensures a 90-degree hybrid of an Integrated Coherent Receiver (ICR) for a coherent communication as disclosed in Patent Document 2 has the following restrictions.
(1) While intersection often occurs on a circuit in the PLC circuit, it is difficult to avoid interference between the signals because of the two-dimensional structure.
(2) It is necessary to keep a phase difference between a local oscillation light of an I phase and a local oscillation light of a Q phase to $\pi/2$ radians for each orthogonal polarized light having an instantaneous phase of the signal light as a reference. This is a hard request for a line length error and a line width error between the lines, and means low yield and higher price of the product.

These restrictions can be solved by a configuration as illustrated in FIG. 15 with three-dimensional wirings, providing the properties of
intersection of optical paths is achievable without the interference of the signal, and
high symmetry of the structure easily matches the line lengths with high accuracy.

There has been proposed an application of an optical circuit similar to that in the coherent communication to an object detection by Light Detection and Ranging (LIDAR) (Non-patent Document 3). A light emitted from one light source is separated into two, a light that has been hit against an object and returned is used as one and the other is directly used to cause the two lights to interfere, thereby ensuring measurement of a distance to the object and a speed of the object. The present invention ensures this interference circuit in a compact size at a low cost.

CITATION LIST

Non-Patent Document

Non-patent Document 1: D. Lin, P. Fan, E. Hasman and M. Brongersma, "Dielectric gradient metasurface optical elements", Science, Applied Optics, 18 Jul. 2014, pp. 298-302.

Non-patent Document 2: N. Yu and F. Capasso, "Flat optics with designer metasurfaces," Nature materials, 23 Jan. 2014, pp. 139-149.

Non-patent Document 3: Cristopher V. Poulton, Ami Yaacobi, David B. Cole, Matthew J. Byrd, Manan Raval, Diedrik Vermeulen, and Michael R. Watts, "Coherent solid-state LIDAR with silicon photonic optical phased arrays," Optics Letters, vol. 42, no. 20, 15 Oct. 2017, pp. 4091-4094.

PATENT DOCUMENT

Patent Document 1: Japanese Patent No. 3325825
Patent Document 2: JP-A-2011-18002
Patent Document 3: U.S. Pat. No. 7,573,641

DISCLOSURE OF THE INVENTION

Problems to be Solved by the Invention

Here, assume that the "minute half waveplate" described is not the "half waveplate." In this case, not all the entered circular polarized lights do not become circular polarized lights in a reverse direction, and there are components remaining as they are. For its amount, when the phase difference of the waveplate is θ, a strength ratio of the reverse component to the directly output component is $\sin^2(\theta/2):\cos^2(\theta/2)$. Further, while the wavefront of the directly output component does not change, the reverse component is separated to be output because the wavefront is advanced by a phase angle corresponding to a pattern.

The optical element of the present invention has a function as what is called a half mirror. Usually, the half mirror has a function to separate a light entered from an optical path 201 into an optical path 202 and an optical path 203 and separate a light entered from an optical path 204 into the optical path 202 and the optical path 203 while a plate with a controlled reflectance is placed obliquely to the optical paths as illustrated in FIG. 2. Also in the present invention, as illustrated in FIG. 3, a light entered from an optical path 301 is separated into an optical path 302 and an optical path 303 by an optical element 306, and a light entered from an optical path 304 is separated into the optical path 302 and the optical path 303 by the optical element 306.

The difference between the ordinary half mirror and the optical element according to the present invention is apparent when focusing on a dotted line 205 and a dotted line 305 distinguishing between the incident side and the emission side of the light in FIG. 2 and FIG. 3. In FIG. 2, since an optical element 206 is disposed across the boundary between the incident side and the emission side, the boundary between the incidence and the emission does not match a functional surface of the optical element. For example, when this separation is to be performed in multiple stages with respect to a direction 401 from the incident side toward the emission side, a three-dimensional spatial arrangement, for example, as illustrated in FIG. 4 is not avoidable, and the more complicated circuit configuration becomes, the more increased the size is, thus requiring accuracy in position adjustment between the elements.

In contrast, the optical element according to the present invention has, as illustrated in FIG. 3, the boundary between the incidence and the emission of the light that matches the functional surface. Accordingly, this separation function is easily stacked in a travelling direction, and for example, as illustrated in FIG. 5, a complex optical circuit having multiple stages of separation in a direction 501 from the incident side toward the emission side can be achieved. Since it is simply stacking flat plates, the light-beam passes through the required functional portion even if the incidence angle slightly deviates (for example, within 10 degrees), and the function is not lost. Accordingly, the manufacturing is significantly facilitated.

Note that, while this function is achievable in the above-described surface treatment, there are following difficulties.

(1) The distance between the grooves or a cycle of periodic groove becomes at least ⅓ wavelength or more. While the phase is to be finely controlled for each position for controlling the light beam, there is a restriction by the distance between the grooves of the waveplate. Actually, in the first place, for causing the groove to function as the waveplate and have a principal axis direction different from that of an adjacent region, it is necessary that the groove has a length at least equal to or more than the distance between the grooves, preferably, double or more, and the dimension of a minute region cannot be sufficiently decreased. A description will be given below. In each region having width D in FIG. 1, a groove having a shortest length in the region is indicated by a reference sign d. Similarly, also in FIG. 6, the reference sign d is similarly defined. A cycle of the periodically repeated grooves (also referred to as "unit cycle between grooves") is indicated by a reference sign p. For the operation as the waveplate, d/p needs to be large to some extent. When d/p is finite, the phase difference due to birefringence of the region is smaller than π and estimated at approximately $\pi(1-p/2d)$. To make the phase difference originally to be π, for example, 0.95π or more, 0.9π or more, 0.75π or more, or 0.5π or more, d needs to be 10p or more, 5p or more, 2p or more, or p or more, respectively.

Conversely, d is desired to be kept small for higher definition. In the optical element of FIG. 1, d has the upper limit determined by the request to the element, and the more decreased it can be, the more improved the performance of the element is (this is because a quantization error is small). Meanwhile, since p is required to be smaller than it by further one digit to half digits, an advantage that p can be decreased is large.

When the groove is formed in a curved line as illustrated in FIG. 6, since the pitch becomes narrow as the curved line approaches perpendicularity in the arrangement of the same curved lines at equal pitches, the pitch needs to be kept by decreasing the number of the grooves (downsampling). Even in such a case, the pitch interval cannot be made strictly constant, and the pitch interval changes for each position to differ the phase difference.

(2) While an anti-reflection layer needs to be formed on the surface to avoid unnecessary reflection of the light on the element surface, the film formation is difficult on the waveplate to which the surface treatment has been performed.

(3) When a quarter waveplate is achieved by the micro treatment on the element surface, its height becomes approximately 50 nm. For example, assuming the error 1%, a surface treatment accuracy needs to be controlled to approximately 50×0.01=0.5 nm or less, and this requires a highly advanced treatment technique. Meanwhile, since a photonic crystal has a thickness of micron order even to achieve the ¼ waveplate, it is only necessary to control to, for example, approximately 5 μm×0.01=50 nm, this is a value sufficiently ensured by the ordinary thin film process.

(4) Since the operation is achieved on the boundary with air on the element surface, the effect is reduced when a microstructure is filled with an adhesive.

Therefore, the present invention has been made in consideration of the above-described problems, and it is an object of the present invention to provide, not a metasurface, an optical element facilitated in integration.

In summarizing the effects of the present invention in advance, the present invention provides any one or more or all of the following first to third effects.

First, an element that has one side of incidence and an opposite side of emission having a film formation surface as a boundary and separates a light entered from one direction into two directions is ensured.

Second, even if unevenness and non-uniformity of the pitch between the lines are generated by the curved shape and the downsampling, the uniformity of the phase difference between the polarized lights is maintained (FIG. 7).

Third, as examples 9, 10, and 11 described later, combining the photonic crystals ensures the optical circuit integrally having the functions of polarization separation and 90-degree hybrid.

Solutions to the Problems

A first aspect of the present invention relates to an optical element. The optical element includes a waveplate formed in an xy-plane in a three-dimensional space x, y, z. A preferred embodiment of the waveplate is photonic crystals laminated in a z-axis direction. the waveplate has a phase difference $\theta$, and $\theta$ is not an integral multiple of $\pi$ radians. The optical element includes one or a plurality of regions disposed alone or repeatedly in an x-axis direction. That is, a single strip-shaped region is disposed or a plurality of strip-shaped regions are repeated in the x-axis direction, and the region is parallel to a y-axis direction and has a width D. The region having the width D is divided into a plurality of strip-shaped sub regions in the x-axis direction. An axis direction of the waveplate has an angle with respect to the y-axis direction that changes step by step in a range of 0 degrees to 180 degrees in the region having width D, and the angle with respect to the y-axis direction that is uniform in the sub region. For example, the waveplate includes grooves formed along the axis direction.

In the optical element of the present invention, an angle $\beta$ of a slow-wave axis of the sub region with respect to the x-axis is indicated by $\beta=(180 \times x1/D)$ degree+constant clockwise with respect to an x-coordinate x1 of a center line of the sub region. The optical element separates and converts a circular polarized light entering from a $-z$-direction toward a $+z$-direction into a component that is a counterclockwise circular polarized light and bent in a $+x$-direction in an xz-plane and a component that is a clockwise circular polarized light and travels straight with a power ratio $\sin^2(\theta/2):\cos^2(\theta/2)$ when the incident circular polarized light is clockwise, and the components are emitted. Meanwhile, when the incident circular polarized light is counterclockwise, the optical element separates and converts the incident circular polarized light into a component that is a clockwise circular polarized light and bent in a $-x$-direction in the xz-plane and a component that is a counterclockwise circular polarized light and travels straight, and the components are emitted.

Further, another embodiment will be described. An optical element includes a waveplate formed in an xy-plane in a three-dimensional space x, y, z. A preferred embodiment of the waveplate is photonic crystals laminated in a z-axis direction. A phase difference $\theta$ of the waveplate is not an integral multiple of $\pi$ radians. The optical element includes one or a plurality of regions disposed alone or repeatedly in an x-axis direction. That is, a single strip-shaped region is disposed or a plurality of strip-shaped regions are repeated in the x-axis direction, and the region is parallel to a y-axis direction and has a width D. The waveplate has an axis direction as a curved line, and an angle to the y-axis direction continuously changes in a range of 0 degrees to 180 degrees. Specifically, the groove formed on the waveplate is a curved line that matches a curved line $y=(D/\pi) \log (|\cos (\pi x/D)|)+$constant in a range of a discretization error. For example, the waveplate includes grooves formed along the axis direction.

The optical element separates and converts a circular polarized light entering from the $-z$-direction toward the $+z$-direction into a component that is a counterclockwise circular polarized light and bent in the $+x$-direction in the xz-plane and a component that is a clockwise circular polarized light and travels straight with a power ratio $\sin^2(\theta/2):\cos^2(\theta/2)$ when the incident circular polarized light is clockwise, and the components are emitted. Meanwhile, when the incident circular polarized light is counterclockwise, the optical element separates and converts the incident circular polarized light into a component that is a clockwise circular polarized light and bent in the $-x$-direction in the xz-plane and a component that is a counterclockwise circular polarized light and travels straight, and the components are emitted.

In each embodiment of the present invention, the waveplate is especially preferably a quarter waveplate. In this case, the optical element of the present invention separates and converts the circular polarized light entering from the $-z$-direction toward $+z$ into the bent component and the component travelling straight with the equal power (light amount), and emits the components.

The above-described optical element having the curved type groove is preferably geometrically arranged such that one of mutually adjacent projecting portion and depressed portion is branched and joined so as to have a ratio of a maximum value to a minimum value of an interval of the other in the region within double (see FIG. 6 and the like).

The above-described optical element having the curved type groove preferably has the curved line indicated by $y=(D/\pi)\log(|\cos(\pi x/D)|)+$constant when the width of the region is D.

In the optical element of the present invention, the waveplates preferably include the photonic crystals laminated in the z-axis direction. In this case, the photonic crystal preferably has a unit cycle between grooves of 40 nm or more and ¼ or less of a wavelength of the incident light, and the photonic crystal preferably has a cycle in a thickness direction of ¼ or less of the wavelength of the incident light.

While it is publicly known, the photonic crystal only needs to be formed by, for example, a self-cloning method (see Patent Document 1). The photonic crystal is a structure where a refractive index periodically changes in a cycle shorter than that of an operating wavelength of a light to be guided. Especially, the waveplate is preferably the photonic crystal formed by the auto-cloning action. The photonic crystal is a small periodic structure that functions as the optical element. A specific method for manufacturing the photonic crystal includes, as disclosed in Patent Document 1, a method for manufacturing an optical element (wave plate) by sequentially laminating two or more kinds of materials (transparent body) having different refractive indices periodically on a substrate one-dimensionally or two-dimensionally having periodic unevenness, and using a sputter etching alone or simultaneously with a film formation to at least a part of the lamination. This method is also referred to as the self-cloning method. Then, the photonic crystal formed by the self-cloning method is referred to as a self-cloning type photonic crystal. Note that, a technique to form a waveplate using the self-cloning type photonic crystal is publicly known. For example, another method for manufacturing the photonic crystal includes a method to form a periodic void by irradiating a glass with a femtosecond laser.

Similarly, a technique to form the waveplate includes a method using a liquid crystal.

Note that the several kinds of transparent bodies forming the self-cloning type photonic crystal are preferably any of amorphous silicon, niobium pentoxide, tantalum pentoxide, titanium oxide, hafnium oxide, silicon dioxide, aluminum oxide, and a fluoride such as magnesium fluoride. Two to several kinds having the different refractive indices among them can be selected to be used for the photonic crystal. For example, while the combinations of amorphous silicon and silicon dioxide, niobium pentoxide and silicon dioxide, and tantalum pentoxide and silicon dioxide are preferable, other combinations are also employable. Specifically, the self-cloning type photonic crystal has a structure where a high refractive index material and a low refractive index material are alternately laminated in the z-direction. The high refractive index material is preferably tantalum pentoxide, niobium pentoxide, amorphous silicon, titanium oxide, hafnium oxide, or a combination of two or more kinds of these materials. The low refractive index material is preferably silicon dioxide, aluminum oxide, a fluoride containing magnesium fluoride, or a combination of two or more kinds of these materials.

Describing further specifically, the first aspect of the present invention relates to the optical element. The optical element of the present invention is a waveplate (separate type) where a principal axis direction differs for each region or a waveplate (curved type) where the principal axis direction continuously changes, and the waveplates of the regions each include the photonic crystal where periodic structures are formed in plane and the periodic structures are laminated in the thickness direction. The photonic crystal only needs to be formed by the self-cloning method (see Patent Document 1).

Both the unit cycles between grooves of the periodic structures in the plane forming the respective waveplates and the unit cycles in the thickness directions of the waveplates are a quarter or less of the wavelength of the light entering the optical element. Note that the unit cycle between grooves of the periodic structure in the plane is preferably 40 nm or more. Note that the wavelength of the light entering the optical element is usually assumed to be selected from a range of 400 nm to 1800 nm.

Among the waveplates of the plurality of the regions, a minimum value in the plane of a groove length of the waveplate is equal to or more than the unit cycle between grooves. Note that an upper limit of a maximum value in the plane of the groove length of the waveplate is preferably 50 times or less of a unit cycle between grooves p.

In the case of the waveplate (curved type) where the principal axis direction continuously changes, the geometric arrangement is preferably made such that the projecting portion or the depressed portion is branched and joined so as to have the pitch p of the projecting portion in a range of $0.7 \cdot p_0 \leq p \leq 1.4 \cdot p_0$ when the pitch when the pattern is a straight line is $p_0$. As illustrated in FIG. 3, the self-cloning type photonic crystal has the phase difference change where the variation is small compared with the variation of the pitch. Accordingly, the phase shift from the half waveplate can be decreased when the pitch is changed.

A preferred embodiment of the optical element according to the present invention is an optical element that operates to an entering predetermined circular polarized light. In this optical element, the regions each form the waveplate having the phase difference θ that is not the integral multiple of π radians, and the entered circular polarized light is branched to the circular polarized light in a reverse direction and the circular polarized light having the same rotation with the strength ratio $\sin^2(\theta/2):\cos^2(\theta/2)$.

Since the optical element of the present invention based on the auto-cloning shape photonic crystal waveplate is a volume type basically different from the gradient metasurface (for example, Non-patent Document 1, 2: gradient metasurface), performing an anti-reflective treatment to its surface and lower portion and a connection to another optical element using an adhesive can be facilitated. Since the optical element of the present invention is the volume type and the characteristics are kept approximately constant even when the number of lamination is increased (for example, double) and the lamination cycle and the in-plane cycle are decreased (for example, ½) while the total thickness of the lamination is kept, higher definition of the structure is ensured.

Another preferred embodiment of the optical element of the present invention is removing a boundary between the regions (sub regions) by changing the waveplates of the respective regions formed by parallel lines having determined pitches from the parallel lines to the curved lines. Changing to the curved lines decreases a quantization error, consequently, a phase error can be decreased, a proportion of unwanted polarized wave can be decreased, and a proportion of not branched component can be decreased.

The second aspect of the present invention relates to an optical circuit using the optical element of the first aspect.

In the use of one having the same pattern as that of the optical element of the first aspect and the phase difference of π radians (that is, half waveplate), when a circular polarized light is entered, it becomes a circular polarized light in a reverse direction and is bent. When both components are mixed, the clockwise and the counterclockwise components of the circular polarized light are each separated.

Meanwhile, in the use of one having the same pattern as that of the element of the first aspect and the phase difference of π/2 radians (that is, quarter waveplate), when a circular polarized light is entered, it is separated into a circular polarized light in the same direction and a circular polarized light in a reverse direction. Alternatively, when the circular polarized lights of mutually opposite rotation are input from two directions and respective angles are appropriately selected, two lights into which the circular polarized lights are each separated are superimposed and emitted. This means that the two input lights are redistributed into the two optical paths. When the amplitude of one input is a and the amplitude of the other input is b, the respective redistributed and output lights are $(a+b)/\sqrt{2}$ and $(a-b)/\sqrt{2}$, and function as a directional coupler.

To achieve the functions of the polarization separation and the 90-degree hybrid used in a receiver of the coherent communication by combining the functions of the plurality of optical elements (phase difference π radians and phase difference π/2 radians) is the second aspect of the present invention.

In the optical circuit according to the second aspect, the light is transmitted in the z-direction, and a plurality of planes ($xy_1$, $xy_2$, ... $xy_N$) are provided perpendicular to the light transmission direction. The first plane ($xy_1$) includes n light points (n is an integer). At least any one plane among the second and following planes (xy$_2$, . . . xy$_N$) includes the optical element of the first aspect that has a plurality of axis directions.

In another embodiment of the optical circuit according to the second aspect, the light is transmitted in the z-direction, and a plurality of planes (xy$_1$, xy$_2$, . . . xy$_N$) are provided perpendicular to the light transmission direction. The first plane (xy$_1$) includes two light points (for example, signal light and local oscillation light). At least any one plane among the second and following planes (xy$_2$, . . . xy$_N$) includes the optical element of the first aspect that has a plurality of axis directions. At least one of the light-beams entering the respective light points of the first plane passes through the optical element disposed on the second plane to the N-th plane (N is an integer of 1 or more). In this optical circuit, polarized lights at m intersection points (m is an integer of 1 or more) that have passed through the N-th plane each have a complex amplitude as a first-order linear sum of complex amplitudes of respective polarized lights of the light-beams entering the respective light points of the first plane.

In the optical circuit according to the second aspect, the optical element and an element that is the optical element having the phase difference of an integral multiple of n radians are preferably disposed such that predetermined circular polarized lights or linear polarized lights are obtained at a plurality of points of a final plane by performing separation of different kinds of the circular polarized light, branching one circular polarized light-beam into two optical paths, bending of the circular polarized light, and joining and redistribution of the different kinds of the circular polarized light.

In the optical circuit according to the second aspect, the optical element and the element that is the optical element having the phase difference of the integral multiple of π radians are preferably disposed such that two light polarization states and two phases (0 degrees, 90 degrees) of the signal light are obtained on the final plane by performing separation of different kinds of the circular polarized light, branching one circular polarized light-beam into two optical paths, bending of the circular polarized light, and joining and redistribution of the different kinds of the circular polarized light, and a 90-degree hybrid circuit is synthesized with a polarized light separator, the polarized light separator being configured to obtain eight lights in total corresponding to sum signals of and difference signals between the local oscillation light and the signal light.

In the optical circuit according to the second aspect, the optical element preferably includes a plurality of regions in an XY-plane, the regions are preferably each divided into strip-shaped regions having widths D extending in a y-direction, single or a plurality of the strip-shaped regions are preferably disposed in an x-direction, and an axis direction of a waveplate preferably changes from 0 degrees to 180 degrees along the x-direction in the strip-shaped region. In this case, distances in the X-direction in portions corresponding to the axis direction of 0 degrees in respective regions including the strip-shaped regions in the XY-plane are mutually different by ΔD (0<ΔD<D) from an integral multiple of the width D. Then, in the optical circuit, the components emitted as circular polarized lights in a reverse direction by the optical element among the circular polarized lights entered into the respective strip-shaped regions are emitted to be mutually deviated in phase by ΔD/D×2π radians.

The optical element (phase difference π radians) that includes the half waveplate has the following configuration.

That is, the half waveplate is formed in the xy-plane in the three-dimensional space x, y, z, and includes a photonic crystals laminated in a z-axis direction. The half waveplate includes one or a plurality of regions disposed alone or repeatedly in the x-axis direction, and the region is divided into a plurality of strip-shaped sub regions in the x-axis direction. A groove direction of the photonic crystal has an angle to the y-axis direction that changes step by step in a range of 0 degrees to 180 degrees in the region, and the angle to the y-axis direction is uniform in the sub region. Alternatively, the groove direction of the photonic crystal is a curved line, and the angle to the y-axis direction continuously changes in a range of 0 degrees to 180 degrees. As a result, the optical element that includes the half waveplate separates and converts the light entering in the z-axis direction into the circular polarized light in the direction toward the x-axis by a certain angle from the z-axis and the circular polarized light in a reverse direction in the direction toward the −x-axis by the same angle from the z-axis, and the circular polarized lights are emitted.

The second aspect will be described by referring to FIG. 15. Two lights referred to as a signal light and a local oscillation light are input to the optical circuit. The lights pass through a first optical element 1501, a second optical element 1502, a third optical element 1503, and a fourth optical element 1504 in this order.

The first optical element 1501 performs the separation of different kinds of the circular polarized light, and one having the pattern similar to that of the optical element (separate type or curved type) according to the first aspect and the phase difference of r radians is disposed.

As the second optical element 1502, one that is the optical element according to the first aspect and has the phase difference of π/2 radians is disposed.

As the third optical element 1503, an optical element that is a half wave plate and has an axis direction of a certain region different from the axis direction of another region by 45 degrees is prepared.

As the fourth optical element 1504, one that is the optical element according to the first aspect and has the phase difference of π/2 radians is disposed.

The first optical element 1501 separates the entered light into a clockwise circular polarized light and a counterclockwise circular polarized light. Since the signal light and the local oscillation light enter the first optical element at different positions in the y-axis direction, the signal light and the local oscillation light are each separated into two beams to be emitted. Note that the signal light and the local oscillation light enter the first optical element at the same position in the x-axis direction.

The second optical element 1502 has four positions in total at which the respective circular polarized lights (signal lights at two positions and local oscillation lights at two positions) enter, and the circular polarized lights are each separated into a circular polarized light in the direction same as that of the entered circular polarized light and a circular polarized light in a reverse direction. Therefore, eight beams are obtained.

The eight beams enter the third optical element 1503. While the signal light and the local oscillation light are separated into the clockwise circular polarized lights and the counterclockwise circular polarized lights by the first optical element 1501, among them, those separated on a left side in the xz-plane having the center axis parallel to the z-axis as a boundary are defined as a first group, and those separated on a right side are defined as a second group. After transmitting through the second optical element 1502, the first group includes two light beams and the second group includes two light beams, thus obtaining four light beams in total. Furthermore, at the third optical element 1503 as the half waveplate divided into the regions, only one light beam in the first group transmits the half waveplate having the direction different from those of the other three light beams by 45 degrees, and only one light beam in the second group transmits the half waveplate having the direction different from those of the other three light beams by 45 degrees. For the two regions different from the peripheral area, symmetrical positions with respect to the center axis of the third optical element 1503 are selected.

By adjusting the position and the angle for entering the first optical element 1501 in the y-z plane, the respective separated lights can be passed through at the same position on the y-z plane. On the plane of the point, the fourth optical element 1504 is disposed.

To the fourth optical element 1504, the lights are entered at four positions. That is, two lights enter one position from different directions. By the fourth optical element, the incident circular polarized lights are each separated into two, a circular polarized light same as the entered circular polarized light and a circular polarized light in a reverse direction. Accordingly, while 16 beams are output because the two light beams enter each of the four positions to be entered and the two light beams are each separated, by adjusting the angle of the incident light beam and the pattern of the fourth optical element 1504, two separation directions of the lights entered from the different directions can be matched. Then, the lights interfere with one another in the fourth optical element, and finally, the lights are emitted from the fourth optical element as the eight light beams.

As described above, the multi-region quarter waveplate and the multi-region half waveplate are used to perform the polarization separation of the two kinds of the input light of the signal light and the local oscillation light, and the lights are each input to the region division type quarter waveplate and separated, one of the four beams that are each polarized light is transmitted through the half waveplate having the direction different from those of the other three by 45 degrees and is input to another region division type quarter waveplate to be interfered, thereby ensuring obtaining the eight light beams. This function is an action same as the function referred to as the polarization separation and the 90-degree hybrid in a receiving unit of a coherent optical communication system, and simply stacking the optical element can achieve the complicated function.

The optical circuit according to the present invention may be an optical circuit where eight beams are arrangeable at any positions of a plane by inserting the optical elements having the phase differences of the integral multiple of π radians so as to have an individual direction of a pattern to each of the eight beams to individually change the directions of the respective output eight beams. In this case, the optical circuit has the polarization separation function and the 90-degree hybrid function.

The optical circuit according to the present invention may be an optical circuit that includes an element disposed immediately after a portion through which a signal light of a first optical element passes, the element is configured to control a retardation of a birefringence variable with an electrical signal, a light polarization state of the signal light is controlled by the element to generate a component that travels toward an optical receiver and a component without traveling by a second optical element, and a light amount of the signal light toward the optical receiver is controlled by a retardation amount of a liquid crystal. In this case, the optical circuit has the polarization separation function and the 90-degree hybrid function.

Another aspect of the present invention relates to a phase difference measuring instrument. The phase difference measuring instrument according to the present invention uses the optical element to measure a phase difference between two input lights, one of the two input lights as a reference light and the other as a signal light.

The phase difference measuring instrument is used to measure an instrument configured to measure a distance to an object and a speed having one of lights separated from a light source as a reference light and the other irradiated to the object to have a reflected light from the object as a signal light, and measure a position and a speed of the object in a three-dimensional space by mechanically or electrically operating the light irradiated to the object.

Effects of the Invention

The present invention can provide the optical element facilitated in integration. The present invention can suppress the generation of light scattering and the unnecessary light component caused by the higher definition of the structure and discontinuity due to the curved line. The present invention is excellent in workability, such as a surface treatment, cleaning, and an adhesion treatment, and ensures reduction in volume as a component, footprint, and manufacturing cost.

DESCRIPTION OF PREFERRED EMBODIMENTS

The following describes an example 1 to an example 13 of the present invention.

Example 1

In this example, relating to the optical element according to the above-described first aspect, a description will be given of an optical element configured to perform a polarization separation of a clockwise circular polarized light of normal incidence into a clockwise straight light and a circular polarized light in a reverse direction, which is bent with an angle ψ, with an equal power ratio.

Figure 8:
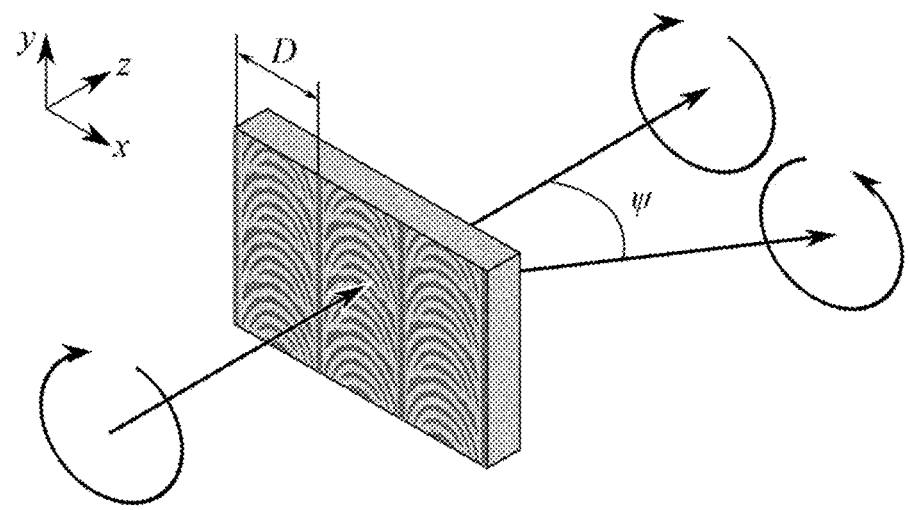
FIG. 8 is a drawing illustrating a function of an optical element according to the second embodiment.

FIG. 8 illustrates an optical arrangement of the optical element. The optical element illustrated in FIG. 8 is what is called a curved type. That is, a basic configuration of the curved type optical element is a waveplate that is formed on an xy-plane in a three-dimensional space x, y, z, and includes photonic crystals laminated in the z-axis direction. In the waveplate, a plurality of regions, which are strip-shaped parallel to the y-axis direction and have widths D, are repeated in the x-axis direction. A groove direction of the photonic crystal is a curved line that matches a curved line y=(Mc) log (|cos (πx/D)|)+constant within a range of a discretization error (see FIG. 6).

Figure 6:
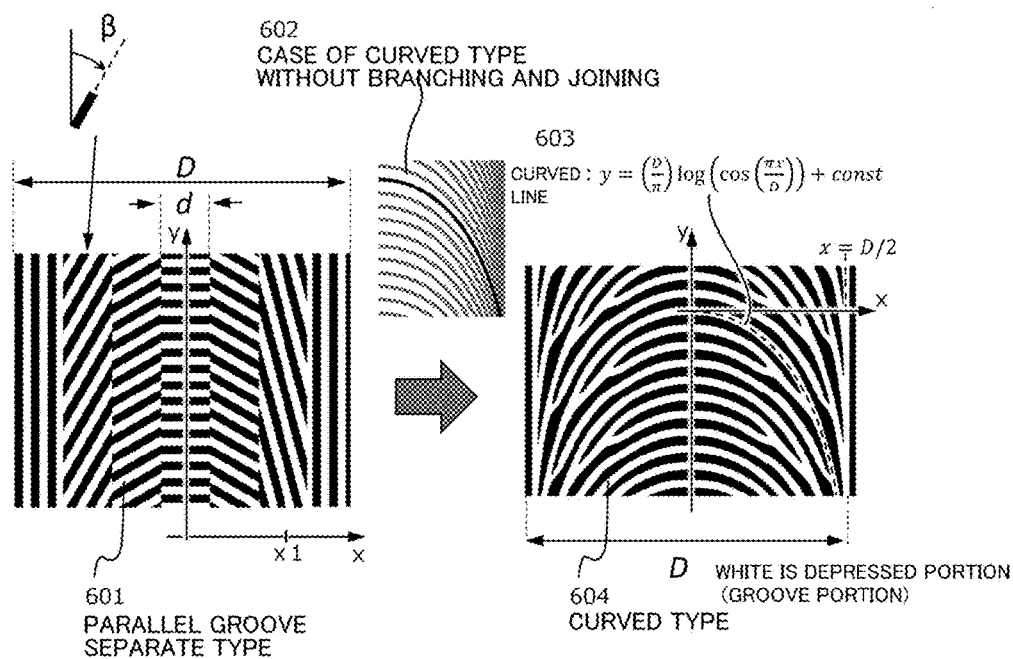
FIG. 6 is a drawing illustrating examples of an optical element (separate type) according to a first embodiment and an optical element (curved type) according to a second embodiment.
Figure 7:
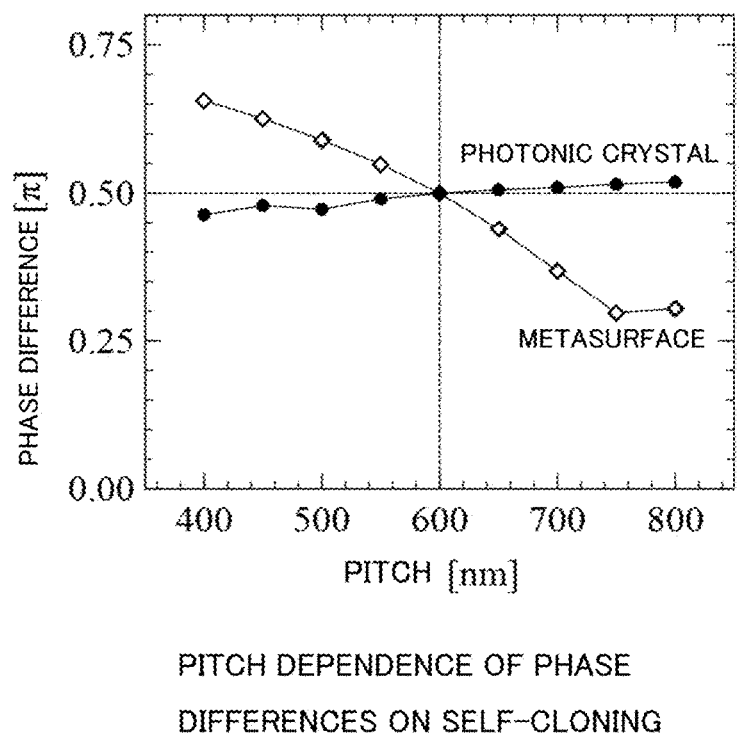
FIG. 7 is a drawing illustrating sensitivity of a phase difference to a pitch change in a case of a photonic crystal.

As illustrated in FIG. 6, patterns (projecting portion or depressed portion) of the photonic crystal formed in the curved line shapes make the patterns sparse in the center portion and dense toward the end to collapse the patterns in one cycle. Then, a pitch between the patterns in the center portion is taken as a reference and defined as $p_0$. At a position where $p_0$ becomes a threshold pitch or less, two patterns are joined. While the pitch immediately after the join becomes $2p_0$, since it becomes dense toward the end, the join is made again at a position of a threshold pitch or less. Repeating the above-described operation ensures an ideal optical axis distribution while the pitch varies within a certain range. When the threshold pitch is $0.5p_0$, the variation range of the pitch becomes $0.5p_0$ to $2.0p_0$. That is, a geometric arrangement is made such that one of the mutually adjacent projecting portion and depressed portion is branched and joined so as to have a ratio of the maximum value to the minimum value of an interval of the other within four times, preferably double. In the example illustrated in FIG. 6, the white-colored part is the depressed portion and the black-colored part is the projecting portion. That is, in the case of the waveplate (curved type) where the principal axis direction continuously changes, the geometric arrangement is made such that the projecting portion or the depressed portion is branched and joined so as to have the pitch p of the projecting portion in a range of $0.5 \cdot p_0 \leq p \leq 2 \cdot p_0$ when the pitch when the pattern is a straight line is $p_0$.

On the other hand, the optical element of the present invention is not limited to the curved type, but may be what is called a separate type. That is, a basic configuration of the separate type optical element is a waveplate that is formed on an xy-plane in a three-dimensional space x, y, z, and includes photonic crystals laminated in the z-axis direction. In the waveplate, single or a plurality of regions, which are strip-shaped parallel to the y-axis direction and have widths D, are repeated in the x-axis direction. The region with the width D is divided into a plurality of strip-shaped sub regions parallel to the y-axis. The groove formed on the waveplate (groove direction of photonic crystal) has an angle to the y-axis direction that changes step by step in a range of 0 degrees to 180 degrees in the region with the width D, and the angle to the y-axis direction is uniform in the sub region.

As illustrated in FIG. 6, the separate type optical element is formed of a plurality of the regions D periodically repeated at least toward the x-axis direction in the xy-plane. The plurality of regions D preferably have equal lengths in the x-axis direction. The regions D are each further divided into a plurality of the sub regions in the x-direction. The number of divisions of each region D can be three to 21, and is preferably an odd number, such as 5, 7, 9, 11, 13, 15, 17, and 19. The sub regions included in each of the regions D preferably have substantially equal widths in the x-direction. The "substantially equal width" means that the width of the sub region positioned at the center in the x-direction is taken as a reference and an error of ±2% is allowed.

The sub regions each include a plurality of periodically formed grooves. All the widths of the grooves are substantially equal. The grooves are formed from an end to an end in the x-direction in each of the sub regions. In the region D, the sub region positioned at the center in the x-direction includes the grooves extending parallel to the x-axis direction repeatedly formed periodically in the y-direction. On the other hand, in the region D, the sub regions positioned on both right and left ends in the x-direction include the grooves extending parallel to the y-direction. Therefore, angles θ of the grooves formed on the sub regions on both right and left ends to the grooves formed on the sub region in the center are 90 degrees. In these sub regions, the lengths of the grooves are longest, and match the effective dimensions in the y-direction of the whole element.

Between the sub region in the center and the sub regions on both right and left ends, a plurality of the sub regions are positioned on each of right and left. Then, these interposed sub regions each include a plurality of the grooves repeatedly formed periodically in the y-direction. All the angles of the grooves formed in a sub region are equal. However, the interposed sub regions each have an angle θ of the grooves set to gradually approach 90 degrees from the sub region in the center toward the sub regions on both right and left ends. For example, the respective four sub regions are disposed between the sub region in the center and the sub regions on both right and left ends, and when the angle of the grooves of the sub region in the center is assumed to 0 degrees and the angles of the grooves of the sub regions on both right and left ends are assumed to 90 degrees, an inclined angle θ is steepened by 22.5 degrees for each sub region in an order from the region close to the sub region in the center. Thus, the regions D are each divided into the plurality of sub regions having the equal widths in the x-direction, the sub regions each include the periodically formed grooves having the equal angles, and the groove angles are configured to monotonically increase from the sub region positioned at the center in the x-direction toward the sub regions positioned on both right and left ends.

Figure 1:
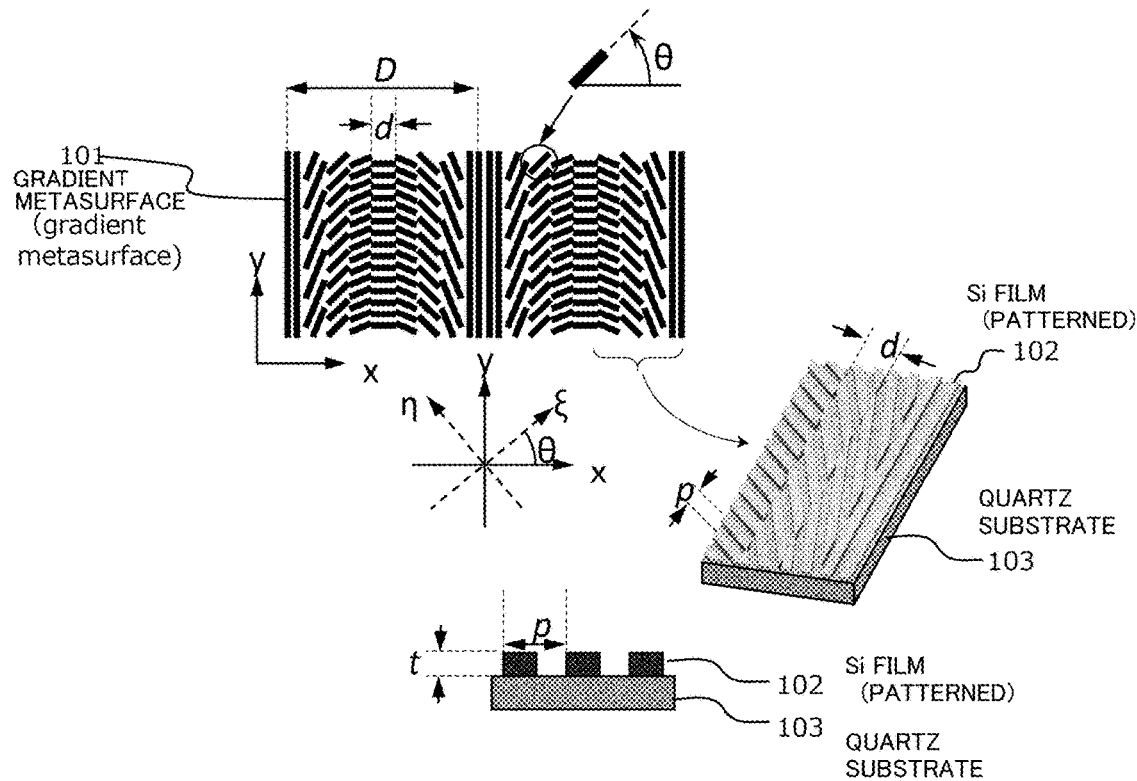
FIG. 1 is a polarization grating achieved by using a gradient metasurface as prior art.
Figure 2:
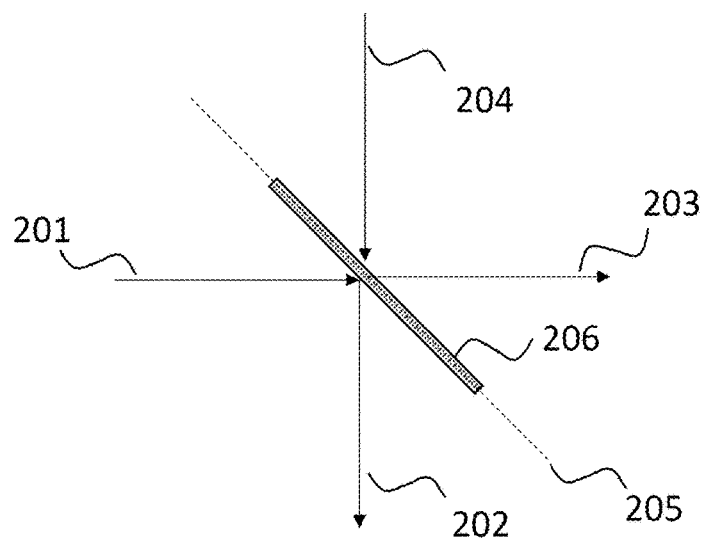
FIG. 2 is a drawing illustrating a function of a half mirror of the prior art.

Under these prerequisites, in each sub region, the unit cycle between grooves p (see FIG. 1) of the periodic structure becomes a quarter or less of the wavelength of the incident light (for example, selected from 400 nm to 1800 nm). The unit cycle between grooves p has a lower limit value of 40 nm. In a thickness direction (z-direction), two types of transparent medium having different refractive indices also have unit cycles of a quarter or less of the wavelength of the light. The unit cycle in the thickness direction has a lower limit value of 40 nm. Then, in the whole of the plurality of regions D, an in-plane minimum value d (see FIG. 6) of the groove length becomes one time or more of the above-described unit cycle between grooves p. Note that, an upper limit value of the in-plane minimum value d of the groove length is considered to be 50 times of the above-described unit cycle between grooves p. Here, as illustrated in FIG. 6, since all the widths in the x-direction of the plurality of sub regions formed in a region D are equal, the in-plane minimum value d of the groove length in the region D is basically the length of the groove formed in the sub region positioned in the center of the region D. The groove length tends to become long toward the grooves in the regions on both right and left sides in the x-direction.

Assume that, in the three-dimensional space xyz, the travelling direction of the light is the z-axis. When an optical element having a cycle D is disposed in the xy-plane, and a gradient from the x-axis as its slow axis direction is defined to θ, an emission light is indicated by the following formula.

$$\begin{pmatrix} E_x \\ E_y \end{pmatrix} = \begin{pmatrix} \cos\theta & \sin\theta \\ -\sin\theta & \cos\theta \end{pmatrix} \begin{pmatrix} e^{j\frac{\phi}{2}} & 0 \\ 0 & e^{-j\frac{\phi}{2}} \end{pmatrix} \begin{pmatrix} \cos\theta & -\sin\theta \\ \sin\theta & \cos\theta \end{pmatrix} \begin{pmatrix} 1 \\ j \end{pmatrix}$$

When the optical element has a phase difference φ of λ/4, the formula above is organized as follows.

$$\begin{pmatrix} E_x \\ E_y \end{pmatrix} = \frac{1}{\sqrt{2}} \begin{pmatrix} 1 \\ j \end{pmatrix} + \frac{j}{\sqrt{2}} e^{-2j\theta} \begin{pmatrix} 1 \\ -j \end{pmatrix}$$

Therefore, the emission light is separated into a first term: a clockwise straight light and a second term: a circular polarized light in a reverse direction, and the power ratio is equal. Since θ depends on only x, the phase difference depending on x is generated. When θ changes from 0 to π in proportion toxin one cycle D, the gradient of the phase of the output wave second term changes at the position of x=D by 2π from the position of x=0. Accordingly, it is seen that the light of the second term is emitted to be bent with respect to the z-axis by ψ=sin⁻¹(λ/D).

Similarly, when a counterclockwise circular polarized light is entered, the emission light is indicated as follows.

$$\begin{pmatrix} E_x \\ E_y \end{pmatrix} = \frac{1}{\sqrt{2}} \begin{pmatrix} 1 \\ -j \end{pmatrix} + \frac{j}{\sqrt{2}} e^{-2j\theta} \begin{pmatrix} 1 \\ j \end{pmatrix}$$

The emission light is separated into a first term: a counterclockwise straight light and a second term: a circular polarized light in a reverse direction, and the power ratio is equal. It is seen that the gradient of the light of the second term in an equal phase plane has the reverse sign, and the emission is performed by bending with respect to the z-axis by ψ=sin⁻¹(λ/D).

Since the optical elements of the separate type (FIG. 6 left) and the curved type (FIG. 6 right) both have the phase difference of π/2 radians, they can be branched with the equal power ratio at the incidence of the circular polarized light. However, since the curved type optical element has the principal axis direction of the waveplate that changes more smoothly, the phase error is small and the higher performance is provided. When the required performance is satisfied by the separate type optical element, the separate type can be selected for convenience of the process.

Note that, while these are satisfied as the above-described formulas when the value of D is sufficiently large compared with the wavelength, for example, when D is 5 microns relative to the wavelength of 1.5 micron, the rectilinear component becomes more even if the phase difference of the optical element is λ/4. However, even in this case, adjusting the phase difference of the optical element ensures equalizing the rectilinear component with the bent component. The value of D is preferably double or more relative to the wavelength, for example, simply three times to ten times.

Figure 9:
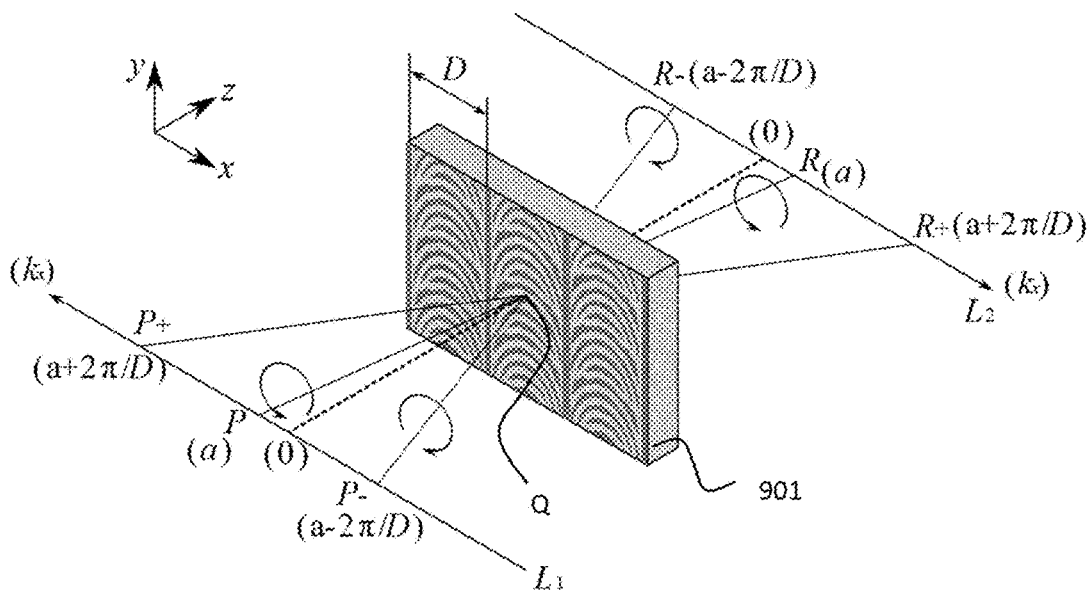
FIG. 9 is a drawing illustrating generality of the function of the optical element according to the second embodiment.

Using FIG. 9, the branching, the bending, the joining, and a linear sum operation of the light-beam will be described. Straight lines $L_1$, $L_2$ are parallel to the x-axis and have equal heights in the y-direction, and a straight line PQR from a point P on $L_1$ to a point R on $L_2$ passing through a point Q on an optical element 901 according to the present invention is defined. For convenience of explanation, refractive indices of media on both sides of the optical element are assumed to be equal. To a light having a free space wavelength λ, the light-beams PQ, QR have equal wave numbers in the x-direction.

$P_-$, $P_+$ are taken on the straight line $L_1$ across P, $R_-$, $R_+$ are taken on $L_2$ across R, the light-beams $P_+Q$ and $QR_+$ are provided with the wave number $a+2\pi/D$ in the x-direction, and the light-beams $P_-Q$ and $QR_-$ are similarly provided with $a-2\pi/D$.

Assume that the light-beam PQ is a counterclockwise circular polarized light, and the phase difference of the optical element is θ. The light-beam PQ is divided into a light beam $QR_-$ of the clockwise circular polarized light and a counterclockwise circular polarized light QR with an amplitude ratio j of sin(θ/2):cos(θ/2). In the case of θ=π, the bent component ($QR_-$) alone is obtained.

When the light-beam $P_-Q$ as the clockwise circular polarized light simultaneously enters, it is divided into the counterclockwise light-beam QR and the clockwise light-beam $QR_-$ with the amplitude ratio j of sin(θ/2):cos(θ/2), they are joined with the above-described divided lights, and linearly superimposed when the entering two lights interfere with one another.

As described above, it has been described that the branching, the bending, the joining, and the linear sum operation between the incident light-beams PQ, $P_+Q$ and the emission light-beams QR, $QR_-$ can be performed with counterclockwise polarization and clockwise polarization as indicators.

Similarly, the branching, the bending, the joining, and the linear sum operation can be provided between the incident lights of . . . , $P_-Q$, PQ, $P_+Q$, . . . and the emission lights of . . . , $QR_-$, QR, $QR_+$, . . . , which have the wave numbers in the x-direction differing by $2\pi/D$.

While, in the above-described description, all the wave numbers in the y-direction are zero for convenience, the same applies to a case having a common wave number.

Also in a case where the media filling the spaces on both sides of the optical element 901 have different refractive indices (for example, air and a glass), the light-beams are corresponded by not the spatial shape but the wave number, and for example, the line $P_+QR_+$ is illustrated as a straight line simply for convenience.

When a plurality of optical elements are used, the direction defining the cycle may be selected to be different for each element, and one element may be divided into a plurality of regions each having the different cycle direction and the cycle.

Example 2

In this example, a description will be given of an optical element configured to branch a clockwise circular polarized light of normal incidence to the optical element according to the present invention to a clockwise straight light and a circular polarized light in a reverse direction bent with an angle ψ with any power ratio.

The example 2 is different from the example 1 in that the phase difference φ of the optical element has any value, not π/2 radians. When the clockwise circular polarized light is normal incidence to the optical element having any phase difference φ, an output light is as below.

$$\begin{pmatrix} E_x \\ E_y \end{pmatrix} = \cos\frac{\phi}{2}\begin{pmatrix} 1 \\ j \end{pmatrix} + \sin\frac{\phi}{2} je^{-2j\theta}\begin{pmatrix} 1 \\ -j \end{pmatrix}$$

Similarly to the example 1, the emission light is separated into a first term: a clockwise straight light and a second term: a circular polarized light in a reverse direction. It is seen that the power ratio becomes $\sin^2(\theta/2):\cos^2(\theta/2)$. Accordingly, controlling the phase difference of the optical element ensures branching to two orthogonal circular polarized lights with any power ratio.

When the counterclockwise circular polarized light enters, $$\begin{pmatrix} E_x \\ E_y \end{pmatrix} = \cos\frac{\phi}{2}\begin{pmatrix} 1 \\ -j \end{pmatrix} + j\sin\frac{\phi}{2} e^{2j\theta}\begin{pmatrix} 1 \\ j \end{pmatrix}$$

is satisfied. The emission light is separated into a first term: a counterclockwise straight light and a second term: a circular polarized light in a reverse direction, and the power ratio becomes $\sin^2(\theta/2):\cos^2(\theta/2)$. Similarly to the example 1, the gradient of the light of the second term in an equal phase plane has the reverse sign, and the emission is performed by bending with respect to the z-axis by $\psi=\sin^{-1}(\lambda/D)$.

Figure 10:
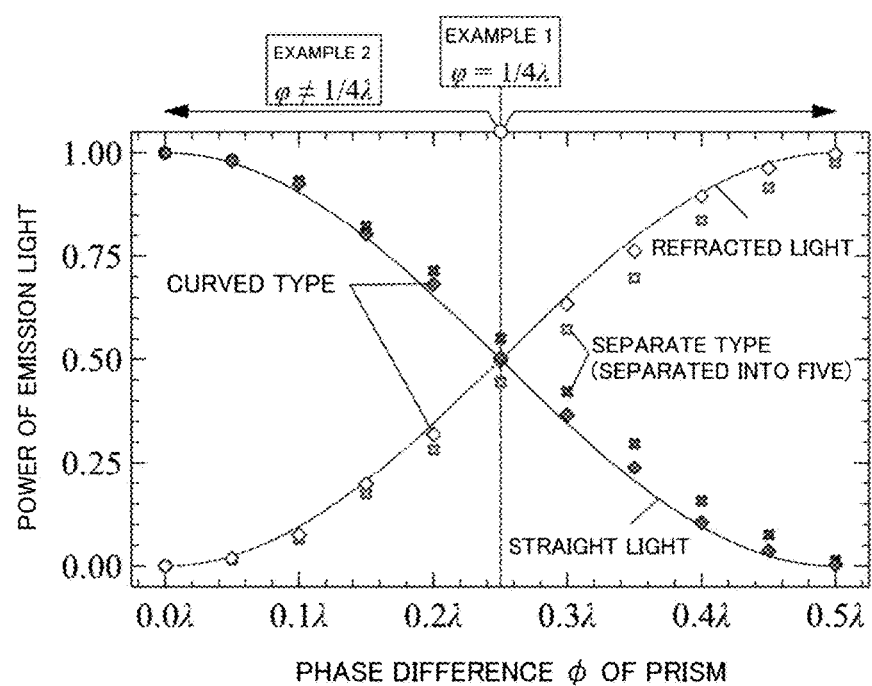
FIG. 10 is a drawing illustrating a power relationship between the phase difference of the optical element according to the second embodiment and a straight light and a bent light.

FIG. 10 is a graph indicating a relationship between the phase difference φ of the optical element and the powers of the straight light and a refracted light. To the curved type and the separate type optical elements, a beam propagation method is used to perform a numerical analysis. Analysis conditions are as follows.

| | |
|---|---|
| wavelength λ | 1.55 μm |
| high refractive index material | a-Si |
| low refractive index material | $SiO_2$ |
| prism cycle D | 10 μm |
| slow axis refractive index $n_s$ | 2.713 |
| fast axis refractive index $n_f$ | 2.486 |
| whole lamination thickness | $\lambda/(n_s - n_f) \times \varphi/(2\pi)$ |

It is seen from FIG. 10 that controlling the phase difference φ as described in the example 2 ensures branching with the power ratio of $\sin^2(\theta/2):\cos^2(\theta/2)$. Especially, as described in the example 1, the branching can be performed with the equal power ratio in the case of φ=π/2 radians. The ranges of the phase difference φ of the examples 1 and 2 are indicated at the top of FIG. 10, and the difference between the curved type and the separate type is indicated by the difference in explanatory notes.

Both optical elements of the curved type and the separate type can perform branching with any power ratio by controlling the phase difference of the optical element. However, since the curved type optical element has the principal axis direction of the waveplate that changes more smoothly, the phase error is small and the higher performance is provided. When the required performance is satisfied by the separate type optical element, the separate type can be selected for convenience of the process.

FIG. 10 illustrates the characteristics at the 0-degree phase difference. The similar power separation characteristics can be obtained at the higher degrees phase difference (for example, $\pi/2$, $3\pi/2$, and $5\pi/2$).

The above description has indicated the method for branching the incident circular polarized light to the two orthogonal circular polarized lights with any power ratio.

Example 3

In the example 1, the method for separation to two polarized lights with equal powers in the case of the circular polarized light of normal incidence has been described. This operation can be considered as a one-input two-output branch circuit (3 dB coupler). In this example, an operation at the incidence of the circular polarized light to the optical element at any incidence angle will be described to indicate that the optical element of the present invention can be operated as a multiple-input-multiple-output branch circuit.

Figure 11:
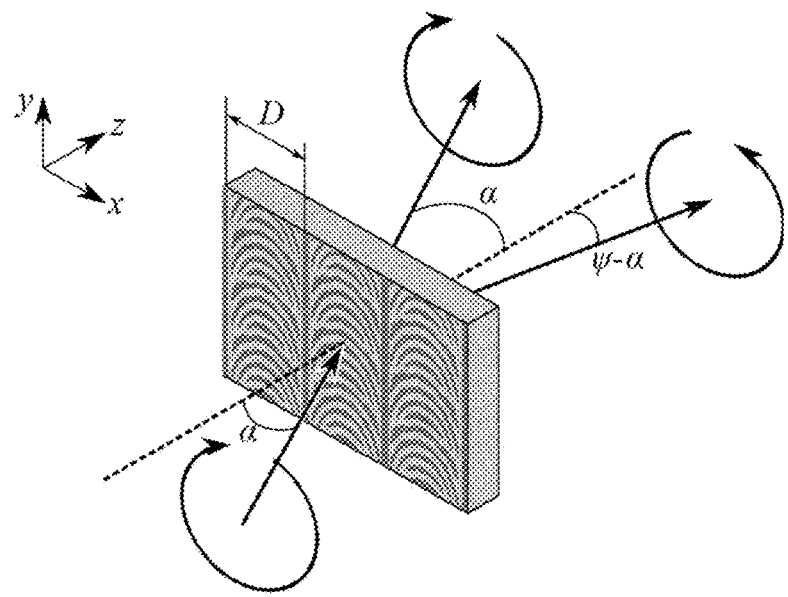
FIG. 11 is a drawing illustrating a function of an optical element according to a third embodiment.

Assume that, as illustrated in FIG. 11, a clockwise circular polarized light enters an optical element with an incidence angle $\alpha$ from the z-axis. When the optical element has the phase difference $\varphi=\pi/2$ radians, the output light is as follows.

$$\begin{pmatrix} E_x \\ E_y \end{pmatrix} = \frac{e^{jk_xx}}{\sqrt{2}} \begin{pmatrix} 1 \\ j \end{pmatrix} + \frac{je^{-j(2\theta-k_xx)}}{\sqrt{2}} \begin{pmatrix} 1 \\ -j \end{pmatrix}$$

Figure 12:
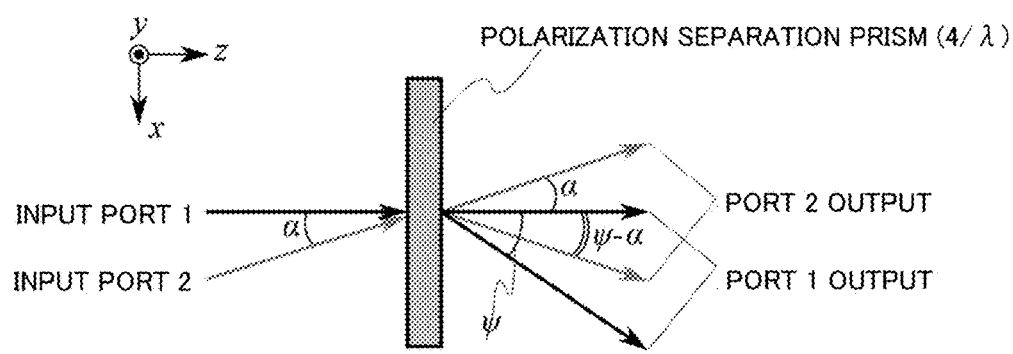
FIG. 12 is a drawing illustrating a relationship between an incident light and an emission light of the optical element according to the third embodiment.

Here, $kx=\lambda/(2\pi) \times \sin \alpha$ is satisfied. Therefore, as illustrated in FIG. 11, the output light can be branched to a first term: a clockwise circular polarized light propagating with an angle $\alpha$ and a second term: a circular polarized light in a reverse direction propagating with an angle $\psi-\alpha$. The power ratio of the branched orthogonal circular polarized lights is equal. Therefore, it can be said that, as illustrated in FIG. 12, by changing the incidence angle to the optical element (an input port of the light is changed), the position of the light to be reached is changed (there are two output ports corresponding to the input port). Accordingly, it can be said that the optical element of the present invention is an N-input-2N-output branch circuit.

The above description has indicated ensuring the operation as the multiple-input-multiple-output branch circuit of a polarization dependent type that can receive the light at the position (two output ports corresponding to the input port) corresponding to the incidence angle by changing the incidence angle (changing the input port) to the optical element.

Example 4

The example 3 has indicated the operation as the N-input-2N-output branch circuit that uniformly distributes the power when the phase difference of the optical element is $\pi/2$ radians. This example indicates an operation as a directional coupler of the polarization dependent type, such as a Mach-Zehnder interference circuit, where the output port is changed depending on an incident polarization wave when the phase difference of the prism is $\pi$ radians.

When the phase difference of the optical element is $\pi$ radians, the emission light of the clockwise circular polarized light that perpendicularly enters the optical element along the z-axis is as follows.

$$\begin{pmatrix} E_x \\ E_y \end{pmatrix} = je^{-j2\theta} \begin{pmatrix} 1 \\ -j \end{pmatrix}$$

Figure 13:
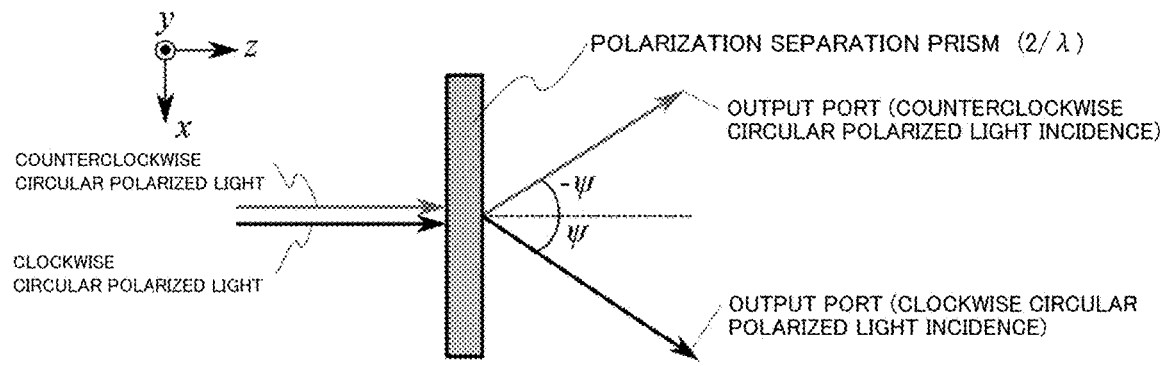
FIG. 13 is a drawing illustrating a function of an optical element according to a fourth embodiment.

It is seen from this that the emission light is a counterclockwise circular polarized light emitted to be bent with respect to the z-axis by $\theta=\sin^{-1}(D/n\lambda)$. n is a refractive index of an emission side medium. Similarly, when a counterclockwise circular polarized light enters, $$\begin{pmatrix} E_x \\ E_y \end{pmatrix} = je^{j2\theta} \begin{pmatrix} 1 \\ j \end{pmatrix}$$

is satisfied, and a conversion into a clockwise circular polarized light emitted to be bent with respect to the z-axis by $\theta=-\sin^{-1}(\lambda/nD)$ is performed. The port for emission can be changed by distinguishing the rotation direction of the incident circular polarized light, that is, by discriminating the light polarization state in the orthogonal relationship as illustrated in FIG. 13.

Figure 14:
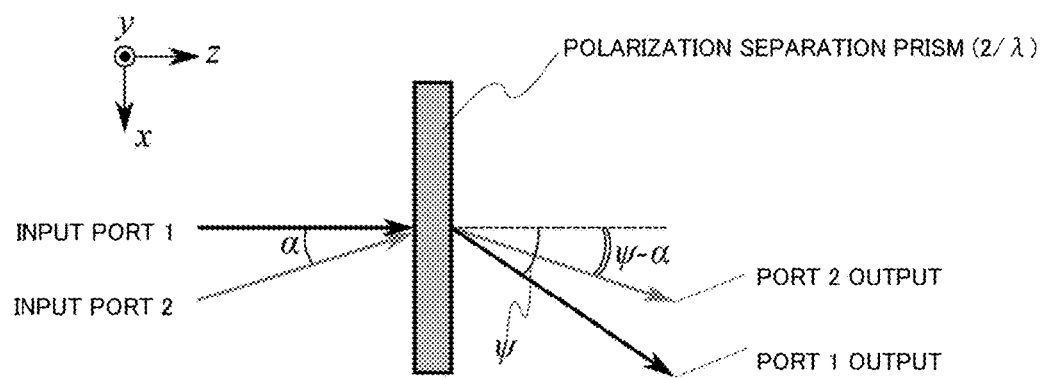
FIG. 14 is a drawing illustrating a relationship between an incident light and an emission light of the optical element according to the fourth embodiment.

Similarly to the example 3, when the clockwise circular polarized light enters the optical element with an incidence angle $\alpha$, the emission light converted into the orthogonal circular polarized light is emitted with an angle $\psi-\alpha$ as illustrated in FIG. 14. That is, since a function to change the port for emission depending on the incidence angle and the light polarization state is provided, the operation as a directional coupler of the polarization dependent type is obtained.

The above description has indicated the operation as the directional coupler of the polarization dependent type where the output port is changed depending on the incident polarization wave and the incidence angle when the phase difference of the optical element is r radians in this example.

Example 5

In the present invention, the optical elements having the functions of the polarization separation, the branching and the bending, and the synthesis are stacked with respect to the light traveling approximately perpendicular to a plane to achieve a circuit that includes a plurality of optical paths. This ensures a three-dimensional arrangement and has a high degree of freedom in integration and the like compared with a conventional planar optical circuit. Furthermore, the function of the polarization separation, the branching, and the like is determined by the pattern, the direction and the position can be made accurate, and the optical circuit can be easily achieved with high accuracy when the flatness of the substrate of each element is ensured.

That is, the light is transmitted in the z-direction, and a plurality of planes $xy_1$, $xy_2$, $xy_3$ . . . are provided perpendicular to it, there are M light points on the first plane $xy_1$, and the optical element having a plurality of axis directions and the above-described phase difference of $\pi/2$ radians and the optical element having a plurality of axis directions and the above-described phase difference of $\pi$ radians are disposed on the second, the third, and the following planes. Accordingly, the final plane can achieve an optical circuit that ensures N light points as the result of the branching to or the joining of the two light polarization states provided to each of the M lights.

Using the characteristics, the present invention ensures functions of the polarization separation and the 90-degree hybrid to detect phase modulation, which are necessary for an optical receiver in a coherent optical communication. Since only intensity modulation was performed in a system (Intensity Modulation & Direct Detection IMDD) before the coherent system, only one signal could be put on one fiber. However, in the coherent system, since the phase modulation is performed to the two signals, and the phases are deviated to one another by 90 degrees to superimpose the two signals, and furthermore, since the signals are put per two orthogonal polarized lights, four signals in total can be put. By further performing multiplexing, the transmission capacity can be further increased.

It is important on the receiving side of this system that reached optical signal is separated into each of the orthogonal polarized lights, and they are each interfered with a local oscillation light or a signal light having the wavelength not necessarily matching that of the signal light for each of the polarized lights (in detail, interference of the signal light with an I phase local oscillation light, interference of the signal light with a Q phase local oscillation light), thereby ensuring putting out the original signal (90 degree hybrid). While this 90-degree hybrid requires the separation to the signal light and the oscillation light and requires the synthesis and the interference by a directional coupler, stacking the optical elements of the present invention ensures the 90-degree hybrid.

An exemplary design of the optical circuit that has both functions of the polarization separation and the 90-degree hybrid will be described.

Figure 15:
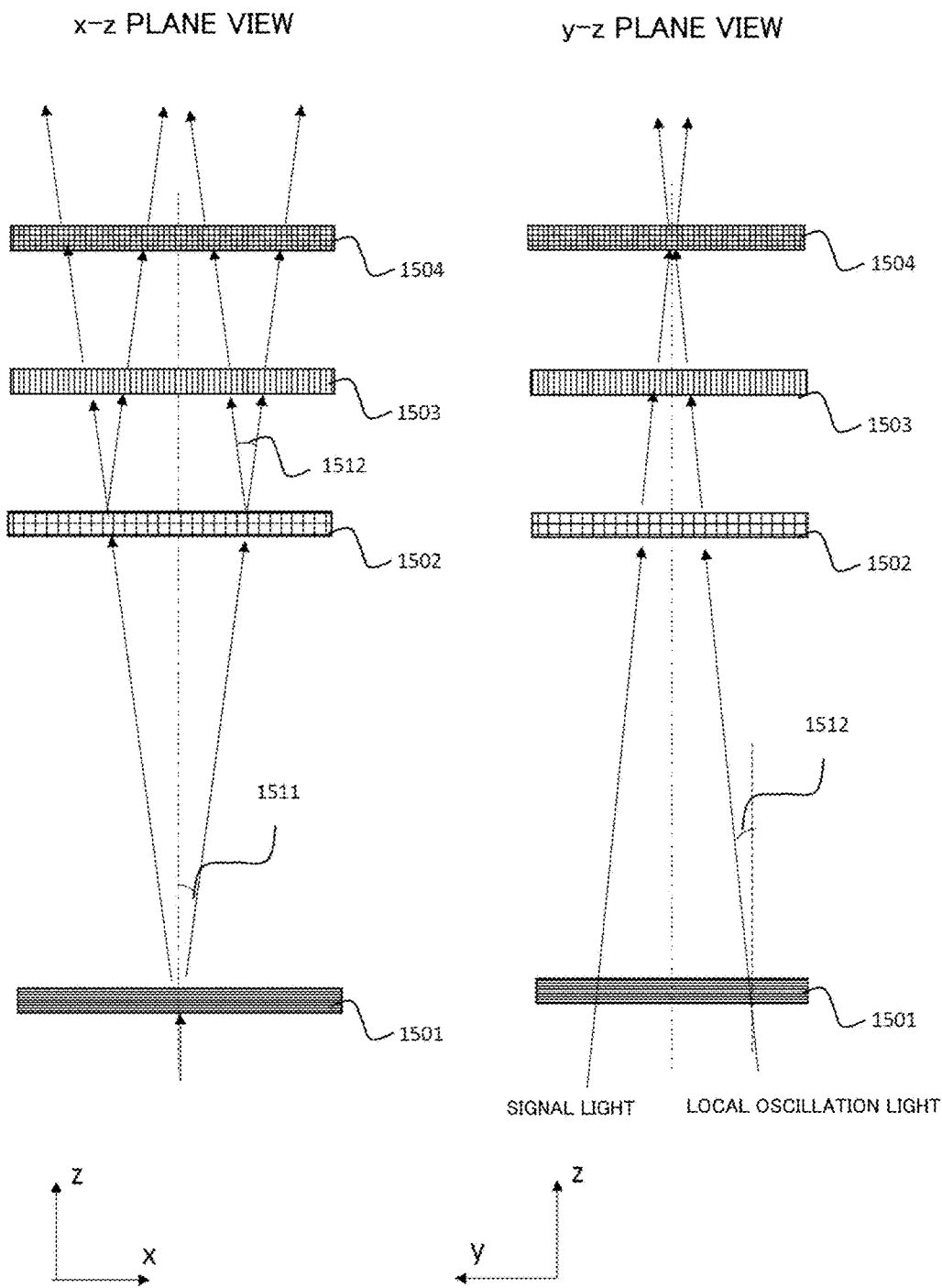
FIG. 15 is a drawing illustrating an arrangement of optical elements and optical paths according to a fifth embodiment.

First, FIG. 15 illustrates the entire configuration. Since the structure is three-dimensional, a cross section on the x-z plane and a cross section on the y-z plane are illustrated. The light travels from a −z-direction toward a +z-direction. While the elements are illustrated mutually separated in the drawing, they are actually fixed by an adhesive having a refractive index approximately equal to the refractive index of the substrate, and integrated.

The first optical element 1501 in FIG. 15 will be described.

The first optical element has a structure that includes the above-described groove pattern (see FIG. 6), and is characterized by having the phase difference of π radians. To the first optical element, a signal light and a local oscillation light enter to be inclined with respect to the z-axis with a predetermined angle 1512.

Figure 18:
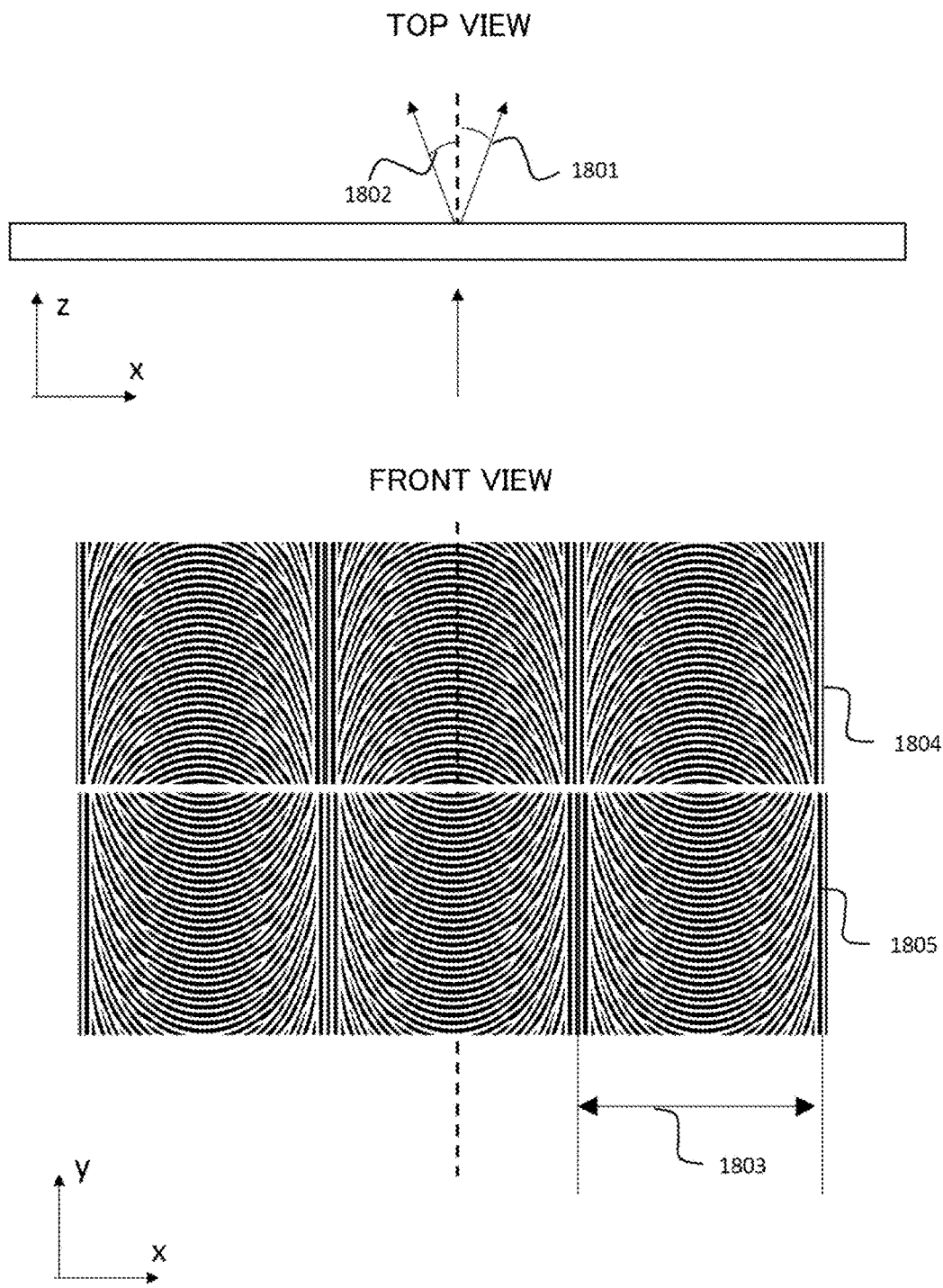
FIG. 18 is a drawing illustrating a pattern and a function of an optical element 1501 of FIG. 15.

FIG. 18 illustrates an exemplary pattern of the first optical element 1501. The patterning was performed on a quartz substrate with a pattern basic cycle (cycle on a dotted line of FIG. 18) of 300 nm as a front view of FIG. 18. In the patterning, the resist was patterned by EB lithography, and the quartz was processed by dry etching. The pattern formation can be performed by also nanoimprint lithography and optical lithography. By the self-cloning method, a multilayer film is laminated thereon. As the materials, $Nb_2O_2$ is used for the high refractive index material, and $SiO_2$ is used for the low refractive index material. Note that, for example, the high refractive index material may be a-Si, $Ta_2O_5$, $HfO_2$, and $TiO_2$. While the low refractive index material is most generally $SiO_2$, it may be a fluoride. The multilayer film is laminated by 90 cycles with the thickness of 72 nm/72 nm per cycle. The thickness of each layer is preferably, for example, 1/50 or more and 1/5 or less of the wavelength.

The first layer and the second layer counting from the substrate and the first layer and the second layer counting from the uppermost portion are adjusted in thickness, thereby reducing the reflection on an interface between the substrate and the multilayer film or an interface between the uppermost layer and the material thereon. For example, the quartz is assumed for the material on the uppermost layer, and Table 1 indicates the film thickness configuration.

TABLE 1

| Substrate Side | | Uppermost Layer Side | |
|---|---|---|---|
| $SiO_2$ | 126 nm | Quartz | — |
| $Nb_2O_5$ | 54 nm | $Nb_2O_5$ | 54 nm |
| Substrate (Quartz) | — | $SiO_2$ | 126 nm |

When a light enters this structure, a clockwise circular polarized light component is separated into a light traveling rightward in FIG. 18 with an angle 1801, and a counterclockwise circular polarized light component is separated into a light traveling leftward in the drawing with the same angle 1802. Since the light can be expressed as a combination of the clockwise circular polarized light and the counterclockwise circular polarized light, whatever light polarization state the entered light has, the light is separated into the respective components to be emitted. The strength ratio depends on the incident polarized light component.

In the case of emission to the medium having the refractive index n, when the wavelength is λ and the cycle in the x-direction of the structure is D, the angle θ is expressed as below.

$$\theta = \sin^{-1}\left(\frac{\lambda}{nD}\right)$$

In this case, the cycle D is indicated by a reference numeral 1803, and the angle θ is indicated by the reference numeral 1801 and the reference numeral 1802 (the angles of 1801 and 1802 are equal).

Assume that the lights enter the first optical element 1501 at two positions aligned in the y-direction, and the signal light enters on the +y-side and the local oscillation light enters on the −y-side. Its pattern is different in direction between the upper and lower sides by 180 degrees as illustrated in the front view of FIG. 18, and the signal light enters a region 1804 on the upper side and the local oscillation light enters a region 1805 on the lower side.

Obviously, the inverse case may be employed. The local oscillation light to be entered is preferably a linear polarized light in a direction parallel or perpendicular to the y-axis. While the lights at the two positions have the incident positions different in the y-direction, the incident positions in the x-direction match.

The incident lights obliquely enter the multilayer film, and the incidence angles are adjusted so as to have the same position on the fourth optical element 1504.

Subsequently, the second optical element 1502 is laminated.

Figure 19:
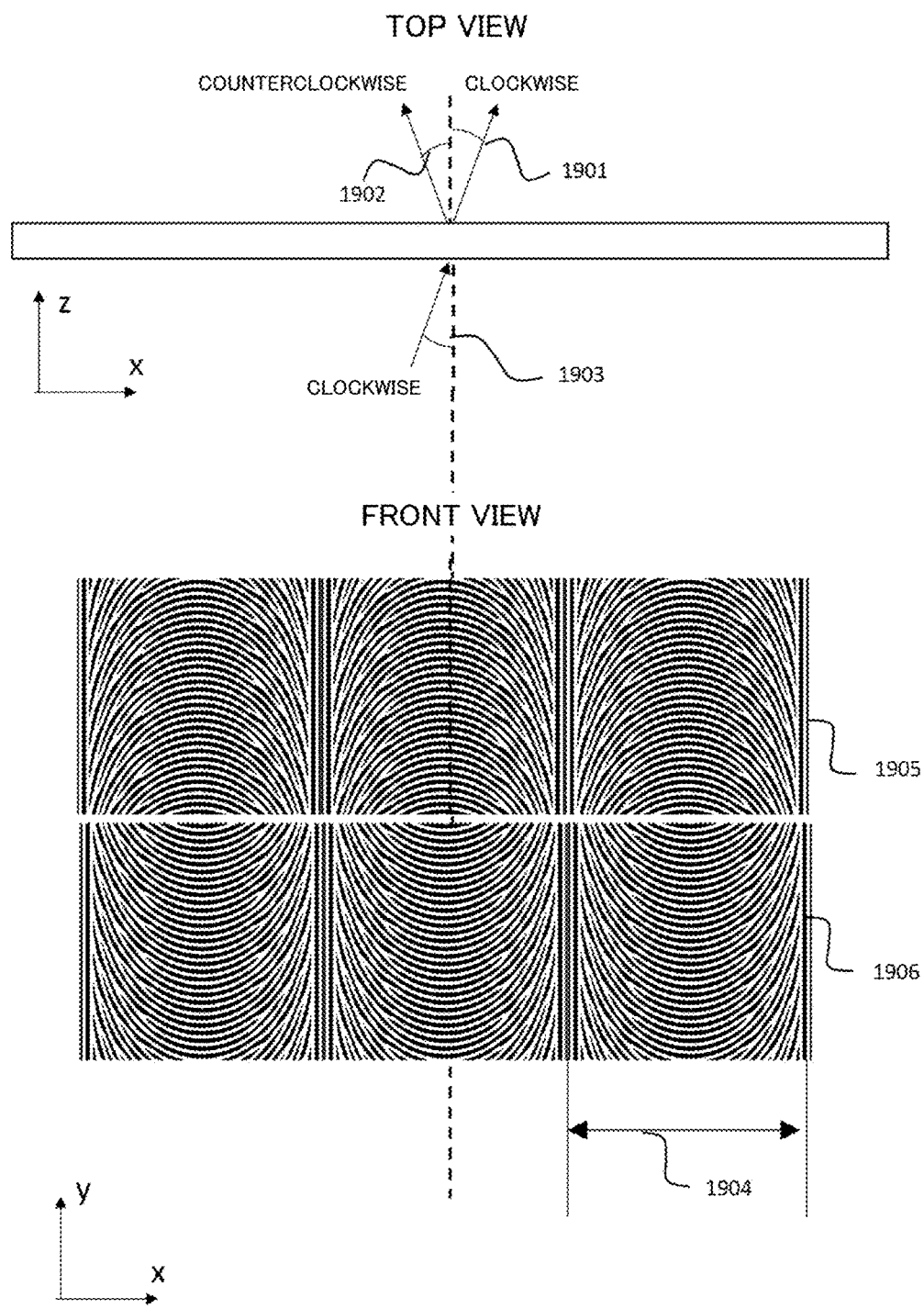
FIG. 19 is a drawing illustrating a pattern and a function of an optical element 1502 of FIG. 15.

The second optical element 1502 is characterized by having the pattern illustrated in FIG. 19 and the phase difference of π/2 radians. Its pattern is different in direction between the upper and lower sides by 180 degrees as illustrated in the front view of FIG. 19, and the signal light enters a region 1905 on the upper side and the local oscillation light enters a region 1906 on the lower side. As a result, while the counterclockwise circular polarized light of the signal light obliquely enters on the right side of the center axis parallel to the y-axis and the clockwise circular polarized light obliquely enters on the left side, as illustrated in FIG. 19, on the right side of the intersection point, by transmitting through the second optical element 1502, the counterclockwise circular polarized light is emitted on the right side and the clockwise circular polarized light is emitted on the left side. For the local oscillation light, this becomes contrary, and the counterclockwise circular polarized light is emitted on the left side and the clockwise circular polarized light is emitted on the right side with respect to the intersection point. This is similar for both the signal light and the local oscillation light also on the left side with respect to the center axis. An angle 1901 is equal to an incidence angle 1903, and a sum θ of the angle 1901 and an angle 1902 is indicated as below.

$$\theta = \sin^{-1}\left(\frac{\lambda}{nD}\right)$$

In this case, the cycle D of the structure is a reference numeral 1904.

While an angle 1511 and the angle 1512 of FIG. 15 are not required to be equal, they may be equal.

When the phase difference is not π/2 radians but Φ as any value, the ratio of the amount of the light emitted on the right and left sides is the left side: the right side=$\sin^2(\theta/2)$:$\cos^2(\theta/2)$. While there is substantially no problem even in asymmetric separation, since the lower light amount degrades the S/N ratio, the light amount is preferred to be equal. Accordingly, Φ is preferably 90 degrees.

Figure 20:
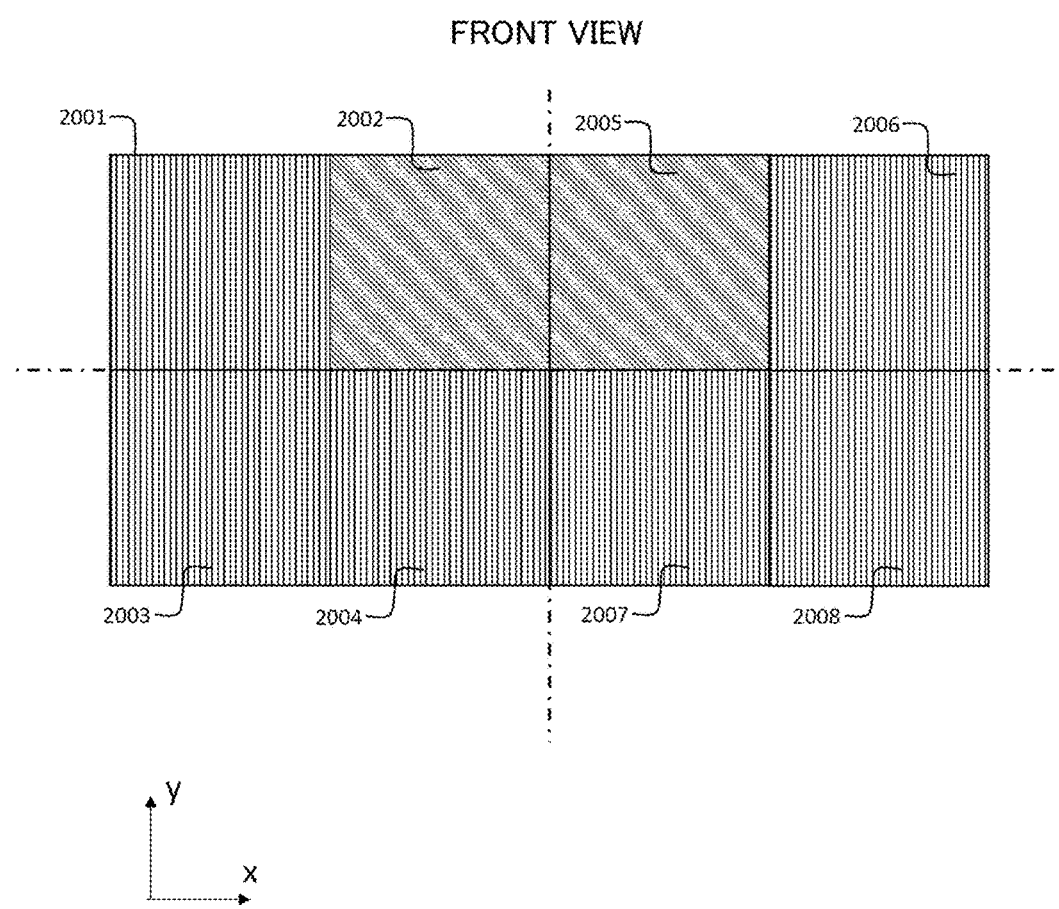
FIG. 20 is a drawing illustrating a pattern and a function of an optical element 1503 of FIG. 15.

The third optical element 1503 is basically a half waveplate, and two signal lights and two local oscillation lights enter on the respective right and left of the center axis, thus having points of light incidence at eight positions in total. FIG. 20 illustrates a front view of the third optical element 1503. As illustrated in FIG. 20, the third optical element has the xy-plane divided into at least eight regions (2001 to 2008). The respective regions correspond to the eight lights in total entering the third optical element 1503. For example, the xy-plane of the third optical element is divided into two in the y-direction and divided into four in the x-direction. The upper leftmost region is defined as the first region 2001, and the region adjacent to the first region 2001 on the right side in the x-direction is defined as the second region 2002. The region adjacent to the first region 2001 on the lower side in the y-direction is defined as the third region 2003, and the region adjacent to the second region 2002 on the lower side in the y-direction is defined as the fourth region 2004. The region adjacent to the second region 2002 on the right side in the x-direction is defined as the fifth region 2005, and the region adjacent to the fifth region 2005 on the right side in the x-direction is defined as the sixth region 2006. Furthermore, the region adjacent to the fifth region 2005 on the lower side in the y-direction is defined as the seventh region 2007, and the region adjacent to the sixth region 2006 on the lower side in the y-direction is defined as the eighth region 2008. While the regions (2001 to 2008) each have a rectangular shape in the example illustrated in FIG. 20, a circular shape, an elliptical shape, and in addition, a multangular shape may be employed insofar as the shape allows the light to pass through.

A relative angle between the first region 2001 and the third region 2003 is configured to be an angle deviated by 45 degrees, and the directions of the second region 2002 and the fourth region 2004 are configured to be same, or on the contrary, a relative angle between the second region 2002 and the fourth region 2004 is configured to be an angle deviated by 45 degrees, and the directions of the first region 2001 and the third region 2003 are configured to be same. Similarly, a relative angle between the fifth region 2005 and the seventh region 2007 is configured to be an angle deviated by 45 degrees, and the directions of the sixth region 2006 and the eighth region 2008 are configured to be same, or on the contrary, a relative angle between the sixth region 2006 and the eighth region 2008 is configured to be an angle deviated by 45 degrees, and the directions of the fifth region 2005 and the seventh region 2007 are configured to be same. The deviation of 45 degrees may be 135 degrees. When the relative angle between the second region 2002 and the fourth region 2004 is deviated by 45 degrees, it is not necessary that any of the directions of the first region 2001 and the third region 2003 or the directions of the second region 2002 and the fourth region 2004 are equal. The same applies to the case where the relative angle between the first region 2001 and the third region 2003 is deviated by 45 degrees. The same also applies to the four regions of the fifth region 2005, the sixth region 2006, the seventh region 2007, and the eighth region 2008. This case employs the pattern illustrated in FIG. 20. The pattern is preferably symmetric with respect to the center axis parallel to the y-axis because similar outputs are obtained for the respective polarized lights.

Then, the fourth optical element 1504 is, similarly to the second optical element 1502 described above, basically a quarter waveplate (phase difference π/2 radians). To the multilayer film of the fourth optical element, the signal light enters from the +y-direction and the local oscillation light enters from the −y-direction, and enters at the same position in the y-axis direction. Thus, the lights separated into the respective upper and lower sides take the same optical path to interfere with one another on the incident surface of the fourth optical element. Then, the light is separated again and emitted from the fourth optical element 1504. This "signal light and local oscillation light are entered and emitted at the same position, each separated into two, and each take the same optical path" is important in the present invention. Therefore, the separation with an angle double of the angle 1512 is required in the fourth optical element 1504.

Figure 21:
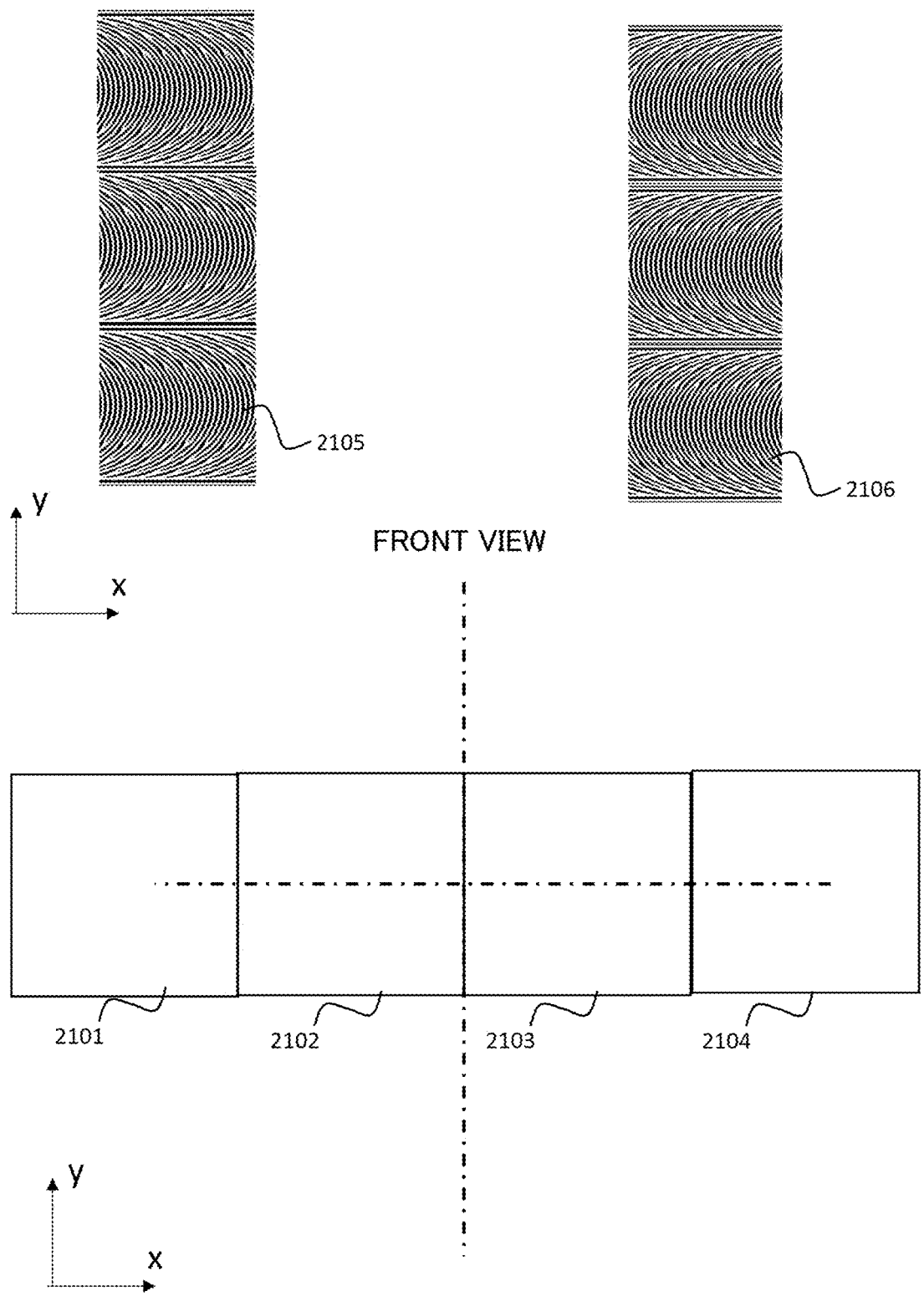
FIG. 21 is a drawing illustrating patterns and functions of an optical element 1605 of FIG. 16 and an optical element 1705 of FIG. 17.

The fourth optical element 1504 has the pattern as illustrated in FIG. 21. The fourth optical element 1504 has a first region 2101, a second region 2102, a third region 2103, and a fourth region 2104 adjacent along the x-axis direction in this order. The first region 2101 and the third region 2103 are formed in a first pattern 2106, and the second region 2102 and the fourth region 2104 are formed in a second pattern 2105. The first pattern 2106 and the second pattern 2105 have the shapes where the pattern illustrated in FIG. 6 is rotated by 90 degrees, and the first pattern 2106 and the second pattern 2105 are linearly symmetrical along the y-axis direction illustrated in FIG. 21. For example, to the first region 2101, the signal light enters from the +y-direction as the clockwise circular polarized light, and the local oscillation light enters counterclockwise from the −y-direction. Meanwhile, to the second region 2102, the signal light enters from the +y-direction as the counterclockwise circular polarized light, and the local oscillation light enters clockwise from the −y-direction. The same applies to the third region 2103 and the fourth region 2104.

Thus, eight beams in total are emitted from the fourth optical element 1504. They are entered to a microlens array having an appropriate pitch, and photodetectors are disposed such that the beams hit the eight photodetectors.

In obliquely entering to the first optical element 1501, controlling the reflectance of its surface ensures causing a part to be reflected. Monitoring its light amount with a photodetector other than the above-described eight photodetectors ensures monitoring of the power of the input light.

Alternatively, the phase difference of the first optical element is configured to be the phase purposely slightly differed from π radians. This ensures separation to the component bent and separated into the clockwise and counterclockwise circular polarized lights by the first optical element and the light that has the same polarized light component of the entered light and travels straight. By removing the patterns of the respective elements on the optical path on which the separated light is transmitted, the light can be directly transmitted straight to the end. Disposing the photodetector at the position ensures monitoring the power of the incident light. This may be integrated on the substrate same as that of the above-described eight photodetectors.

The above-described configuration is merely an exemplary combination, and for example, when the region 1804 is interchanged with the region 1805 in the first optical element of FIG. 18, interchanging the region 1905 with the region 1906 in the second optical element of FIG. 19 and interchanging the pattern 2105 with a pattern 2106 in the fourth optical element of FIG. 21 ensures the similar function.

Example 6

An exemplary design of the element that has both functions of the polarization separation and the 90-degree hybrid according to the other embodiment will be described.

Figure 16:
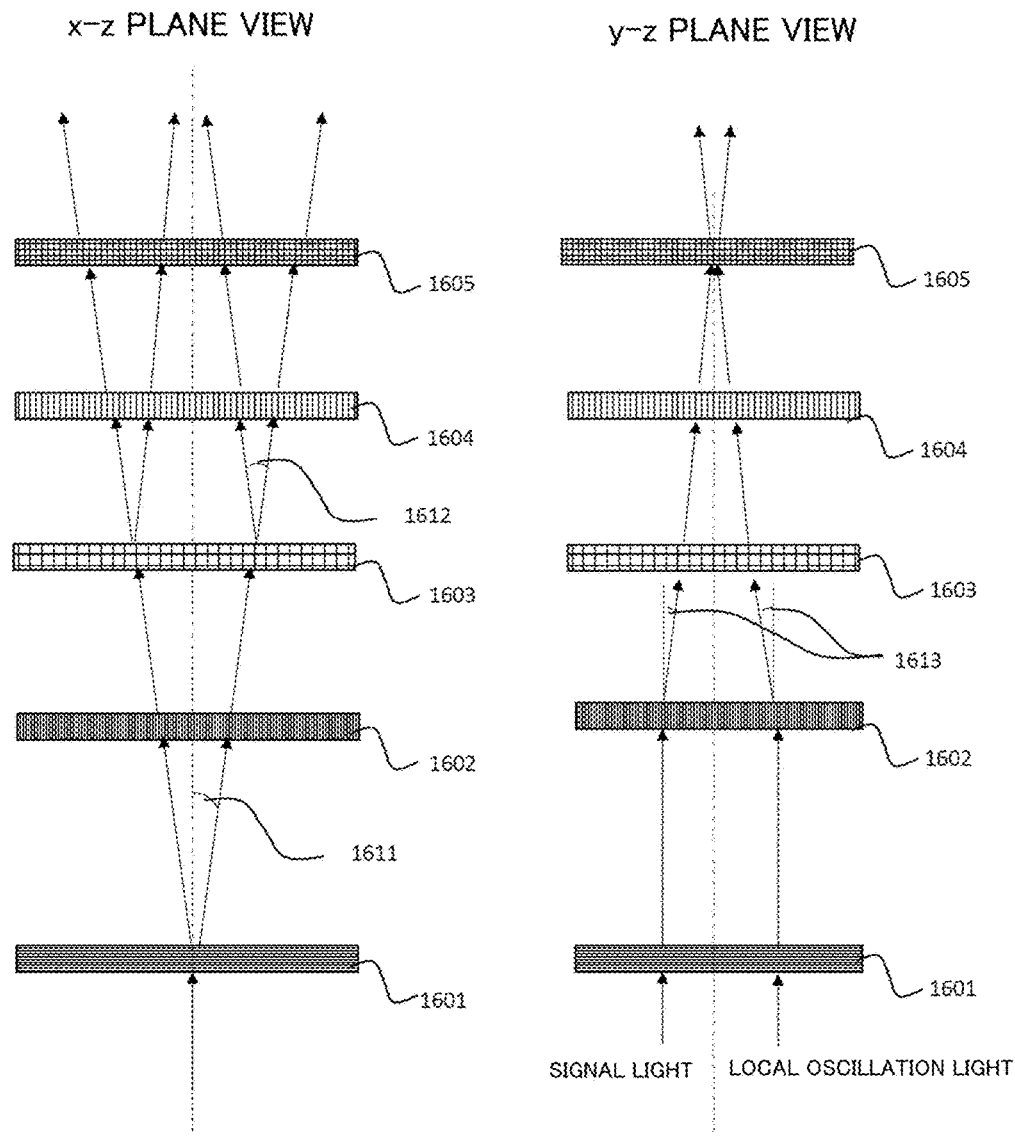
FIG. 16 is a drawing illustrating an arrangement of optical elements and optical paths according to a sixth embodiment.

First, FIG. 16 illustrates the entire configuration. Since the structure is three-dimensional, a cross section on the x-z plane and a cross section on the y-z plane are illustrated. The light travels in the +z-direction. While the elements are illustrated mutually separated in the drawing, they are actually fixed by an adhesive having a refractive index approximately equal to the refractive index of the substrate, and integrated.

While a first optical element 1601 is similar to the first optical element 1501 of the example 5, it is assumed that the signal light and the local oscillation light enter parallel to the z-axis. For example, respective lenses are installed to distal ends of a fiber array where two optical fibers are disposed on a V-groove substrate to form a collimated light, thereby ensuring the establishment of an incident optical system.

Assume that the lights enter the first optical element 1601 at two positions aligned in the y-direction, and the signal light enters on the +y-side and the local oscillation light enters on the −y-side. Its pattern is different in direction between the upper and lower sides by 180 degrees as illustrated in the front view of FIG. 22, and the signal light enters a region 2204 on the upper side and the local oscillation light enters a region 2205 on the lower side.

Obviously, the inverse case may be employed. The local oscillation light to be entered is preferably a linear polarized light in a direction parallel or perpendicular to the y-axis. While the lights at the two positions have the incident positions different in the y-direction, the incident positions in the x-direction match.

Subsequently, a second optical element 1602 is laminated.

Figure 23:
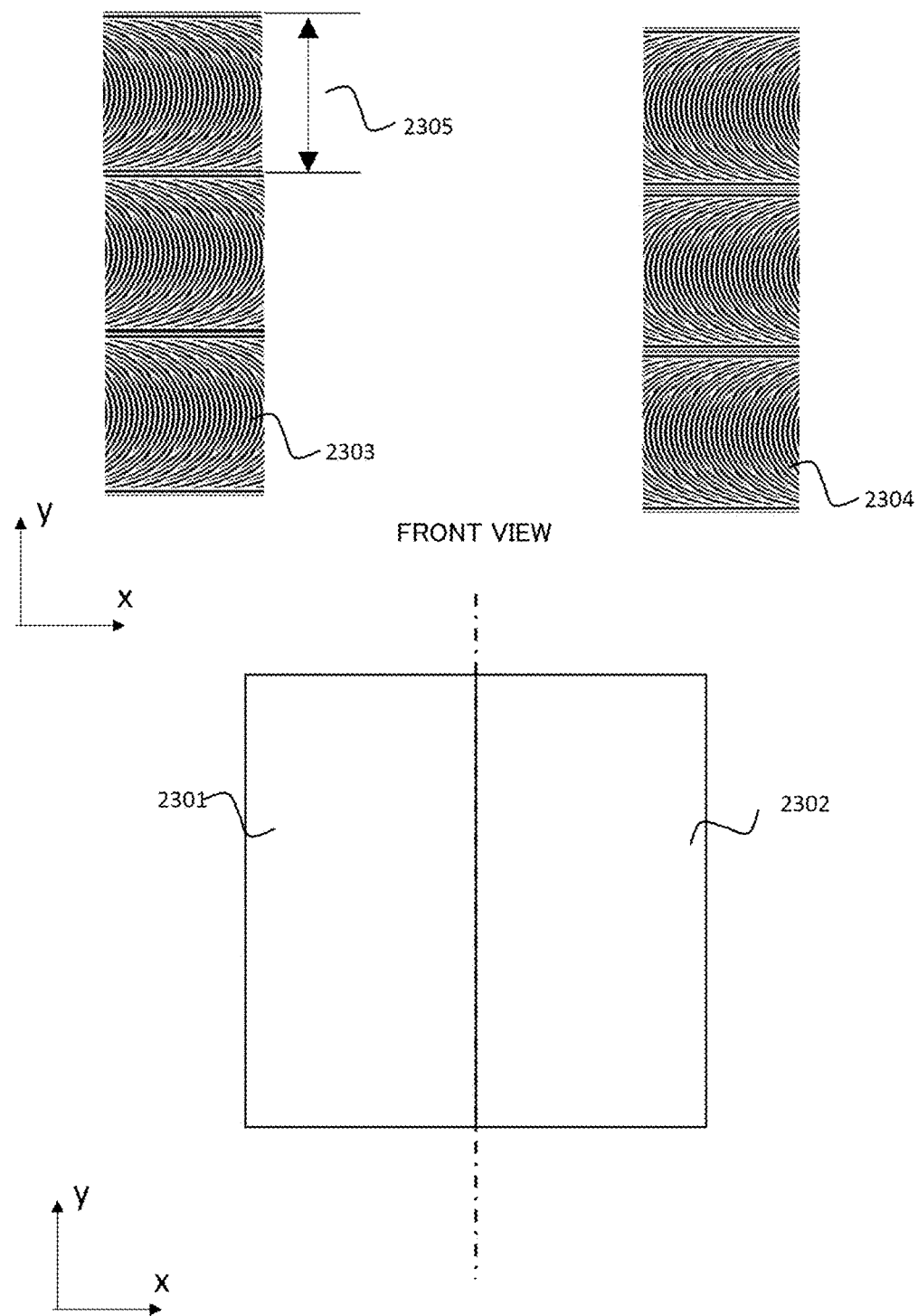
FIG. 23 is a drawing illustrating patterns and functions of an optical element 1602 of FIG. 16 and an optical element 1702 of FIG. 17.

While the second optical element 1602 has the structure of the separate type or the curved type similarly to the first optical element 1601, the second optical element 1602 is characterized by having the phase difference of π radians. However, the second optical element 1602 has the pattern as illustrated in FIG. 23. The second optical element 1602 has the xy-plane divided into two regions 2301 and 2302 in the x-direction. In the first region 2301, a first pattern 2303 is formed, and in the second region 2302, a second pattern 2304 is formed. The first pattern 2303 and the second pattern 2304 have the shapes where the pattern illustrated in FIG. 6 is rotated by 90 degrees, and the first pattern 2303 and the second pattern 2304 are linearly symmetrical along the y-axis direction illustrated in FIG. 23. A cycle 2305 of the first and the second patterns are configured to be same as that of a first optical element 2203. Obviously, it may be different. In this case, an angle 1613 bent by the second optical element 1602 in the y-z plane of FIG. 16 is simply different from 1611, and it is substantially not necessary to be same. The pattern and the thickness of each layer may be changed, or do not need to be changed. However, as a phase plate, the phase of π radians is preferable.

For example, for the signal light, the lights separated by the first optical element 1601 enter the regions having the patterns of mutually opposite directions. The beam on the +x-side is counterclockwise and bent downward by the second optical element. The beam on the −x-side is clockwise and bent downward by the second optical element. Similarly, for the local oscillation light, the beam on the +x-side is clockwise and bent upward, and the beam on the −x-side is counterclockwise and bent upward.

Then, a third optical element 1603 is similar to the second optical element 1502 of the example 5. The third optical element has the pattern illustrated in FIG. 24, and when its cycle 2404 is separated with an angle double of the angle 1611 generated at the first optical element 1601, the symmetry of the circuit is improved.

Figure 25:
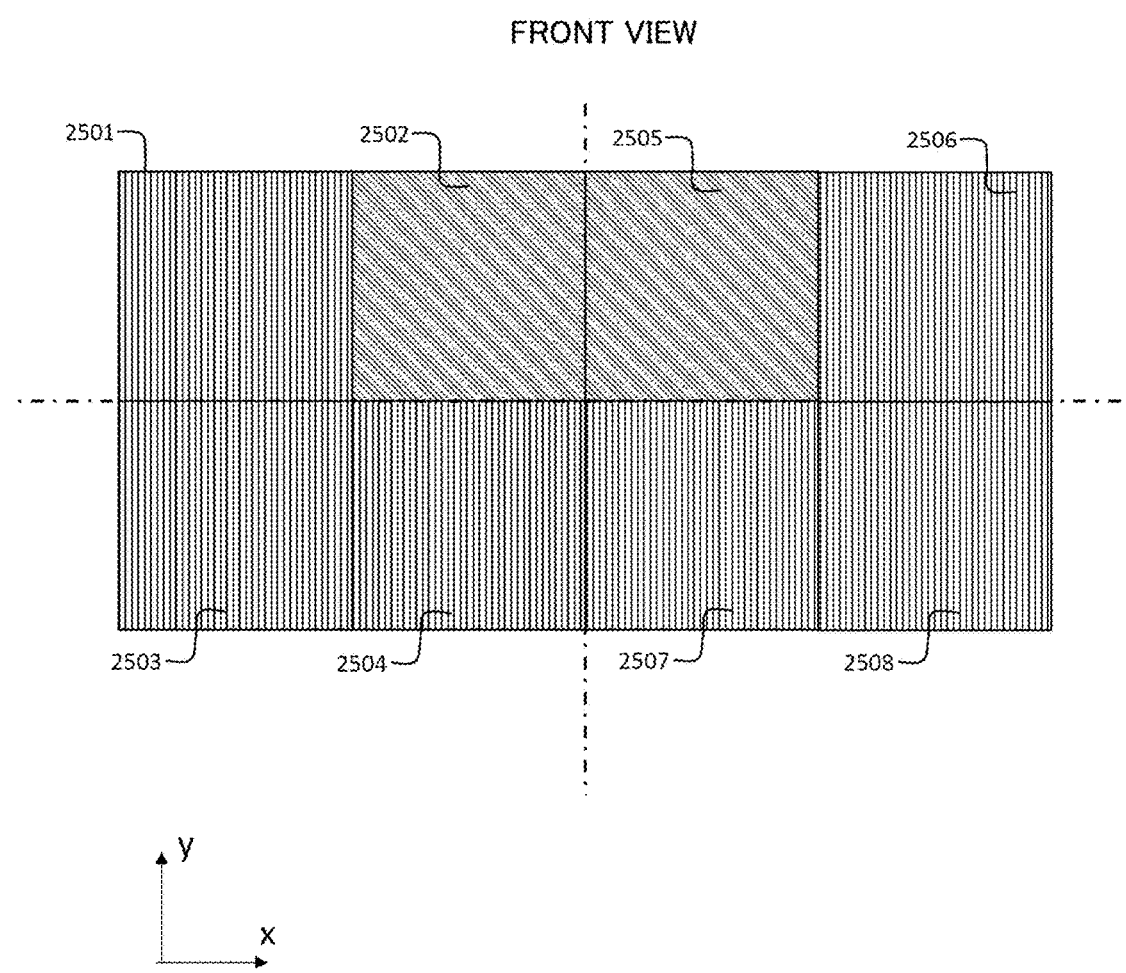
FIG. 25 is a drawing illustrating patterns and functions of an optical element 1604 of FIG. 16 and an optical element 1704 of FIG. 17.

Then, a fourth optical element 1604 is similar to the third optical element 1503 of the example 5 as illustrated in FIG. 25.

Then, a fifth optical element 1605 is basically a quarter waveplate similarly to the third optical element 1503 of the example 5.

Figure 26:
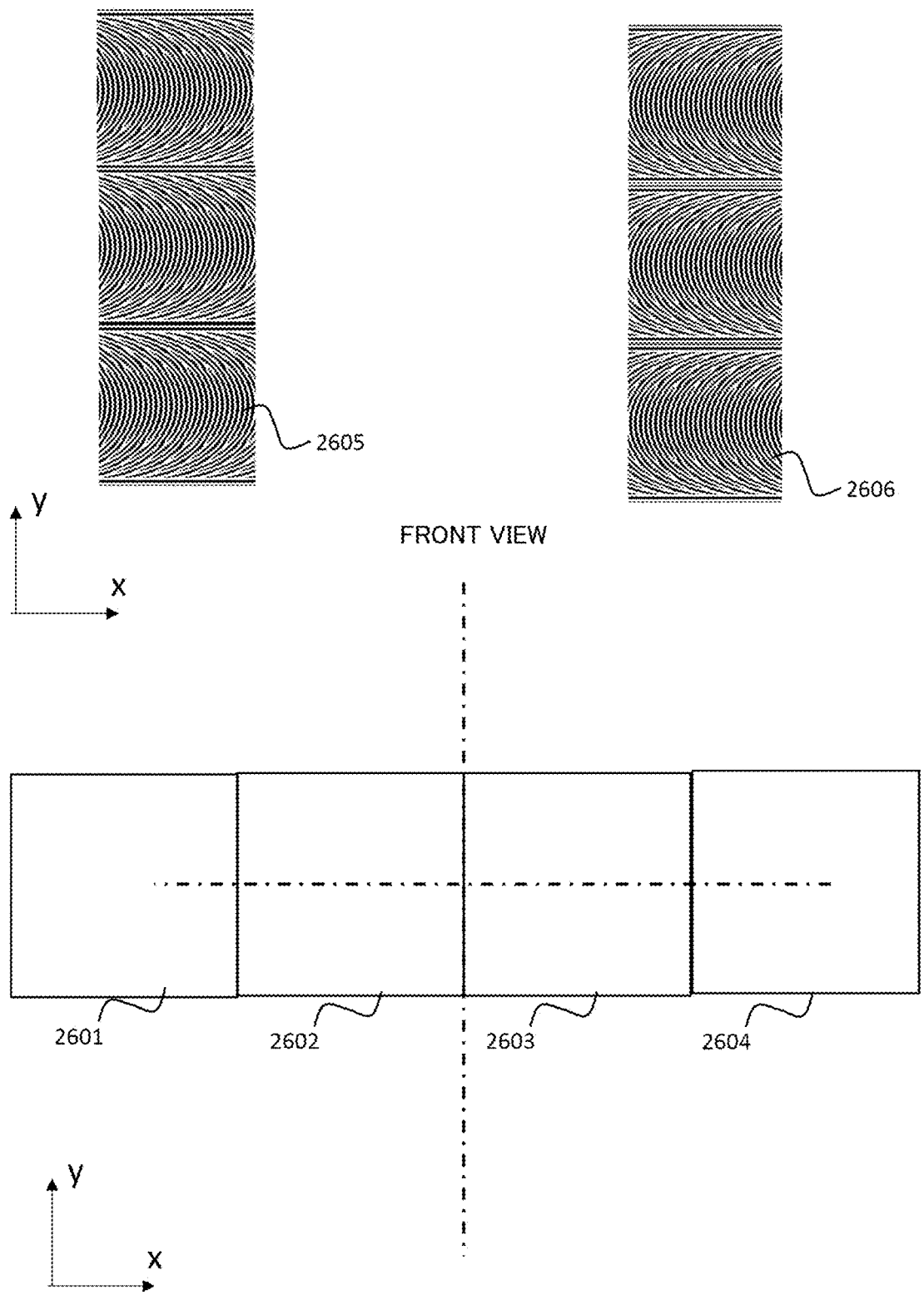
FIG. 26 is a drawing illustrating patterns and functions of an optical element 1605 of FIG. 16 and the optical element 1705 of FIG. 17.

The fifth optical element 1605 has the pattern as illustrated in FIG. 26. A fifth optical element 1605 has a first region 2601, a second region 2602, a third region 2603, and a fourth region 2604 adjacent along the x-axis direction in this order. The first region 2601 and the third region 2603 are formed in a first pattern 2606, and the second region 2602 and the fourth region 2604 are formed in a second pattern 2605. The first pattern 2606 and the second pattern 2605 have the shapes where the pattern illustrated in FIG. 6 is rotated by 90 degrees, and the first pattern 2606 and the second pattern 2605 are linearly symmetrical along the y-axis direction illustrated in FIG. 26. For example, to the region 2601, the signal light enters from the +y-direction as the counterclockwise circular polarized light, and the local oscillation light enters clockwise from the −y-direction. Meanwhile, to the region 2602, the signal light enters from the +y-direction as the clockwise circular polarized light, and the local oscillation light enters counterclockwise from the −y-direction. The same applies to the regions 2603 and 2604.

Thus, eight beams in total are emitted from the fifth optical element. They are entered to a microlens array having an appropriate pitch, and photodetectors are disposed such that the beams hit the eight photodetectors.

Figure 22:
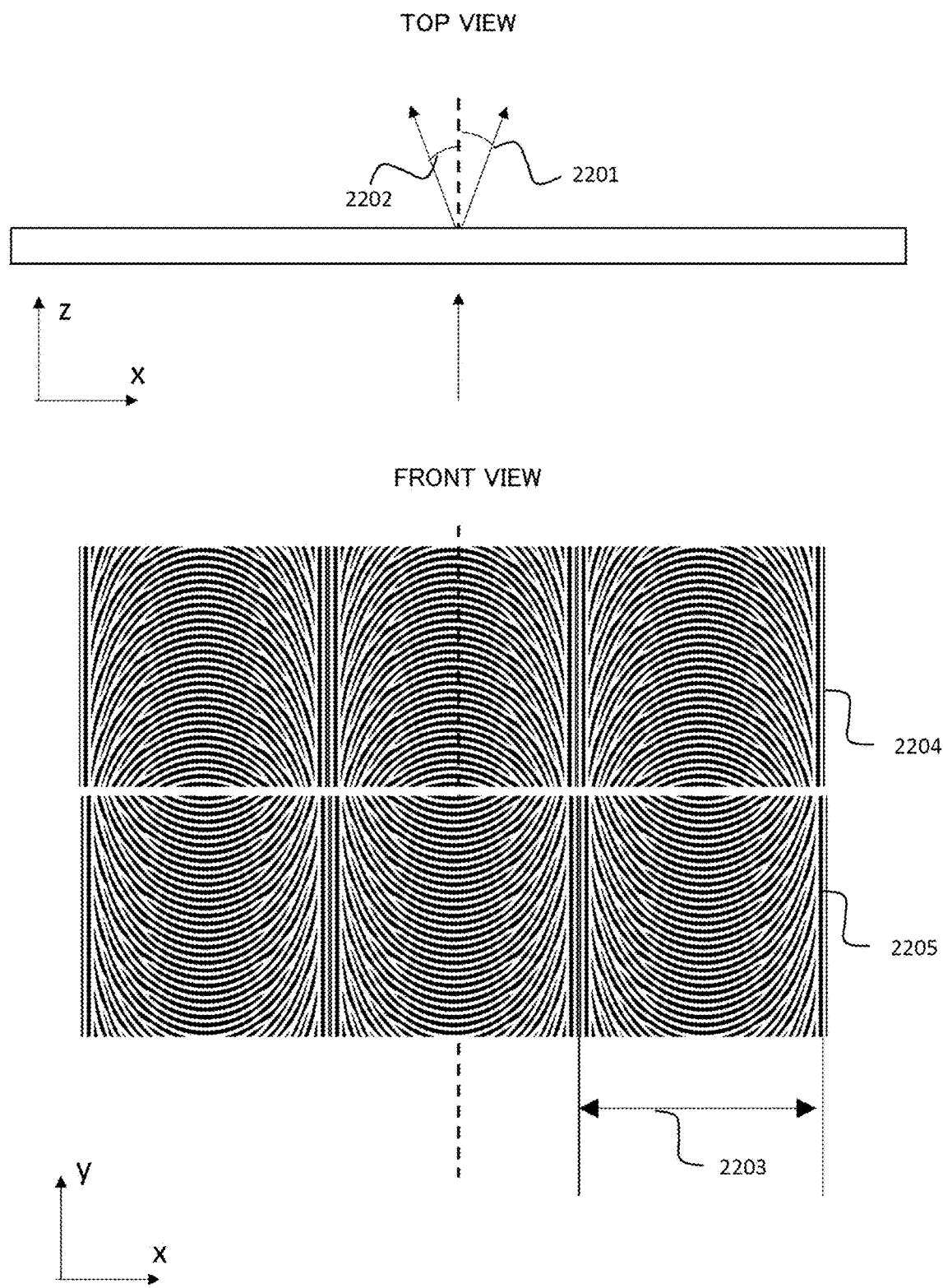
FIG. 22 is a drawing illustrating patterns and functions of an optical element 1601 of FIG. 16 and an optical element 1701 of FIG. 17.
Figure 24:
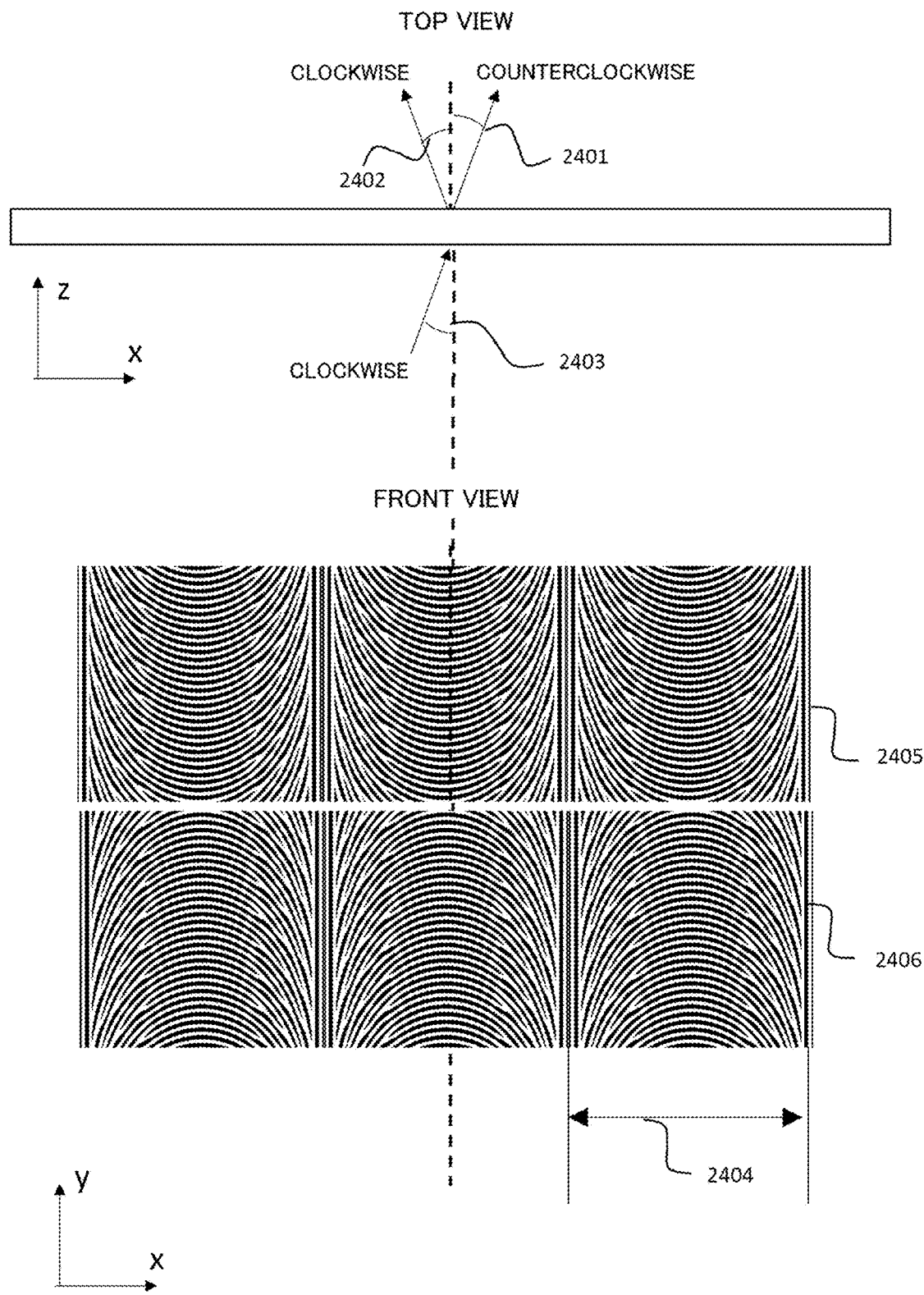
FIG. 24 is a drawing illustrating patterns and functions of an optical element 1603 of FIG. 16 and an optical element 1703 of FIG. 17.

The above-described configuration is merely an exemplary combination, and for example, when the region 2204 is interchanged with the region 2205 in the first optical element of FIG. 22, interchanging the region 2301 with the region 2302 in the second optical element of FIG. 23, interchanging a region 2405 with a region 2406 in the third optical element of FIG. 24, and interchanging the pattern 2605 with the pattern 2606 in the fifth optical element of FIG. 26 ensures the similar function.

Example 7

An exemplary design of the element that has both functions of the polarization separation and the 90-degree hybrid according to the other embodiment will be described.

Figure 17:
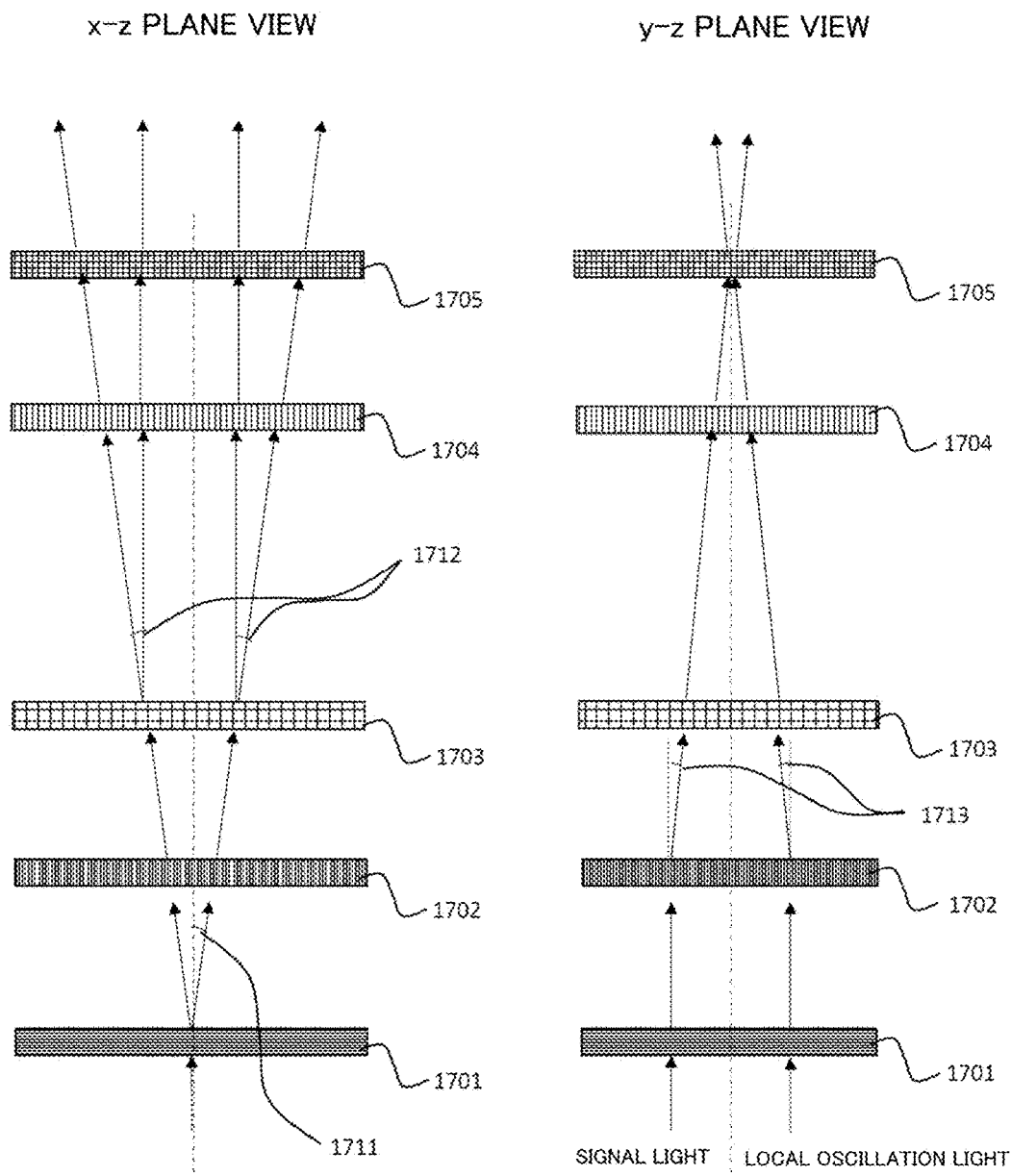
FIG. 17 is a drawing illustrating an arrangement of optical elements and optical paths according to a seventh embodiment.

First, FIG. 17 illustrates the entire configuration. Since the structure is three-dimensional, a cross section on the x-z plane and a cross section on the y-z plane are illustrated. The light travels in the +z-direction. While the elements are illustrated mutually separated in the drawing, they are actually fixed by an adhesive having a refractive index approximately equal to the refractive index of the substrate, and integrated.

A first optical element 1701 is similar to the first optical element 1601 of the example 6.

A second optical element 1702 is similar to the second optical element 1602 of the example 6.

Then, while a third optical element 1703 is similar to the third optical element 1603 of the example 6, increasing a separation angle 1711 compared with a separation angle 1712 avoids traveling of both lights separated by the third optical element in the −x-direction. In the case of traveling in the −x-direction, when the following optical elements are increased in thickness, the component bent leftward by the first optical element is also conversely bent in the +x-direction to possibly collide at anywhere. However, the separate angle 1712 configured to be smaller than the separate angle 1711 eliminates the possibility. Note that equalizing the separate angle 1711 with the separate angle 1712 causes one of the lights emitted from the third optical element to travel parallel to the Z-axis on the x-z plane.

Obviously, the one bent leftward by the first optical element 1701 moves mirror-symmetrically to the above description, and does not travel in the x-direction.

Then, a fourth optical element 1704 is similar to the fourth optical element 1604 of the example 6.

Then, a fifth optical element 1705 is similar to the fifth optical element 1605 of the example 6.

Thus, eight beams in total are emitted from the fifth optical element. They are entered to a microlens array having an appropriate pitch, and photodetectors are disposed such that the beams hit the eight photodetectors.

The above-described configuration is merely an exemplary combination, and for example, when the region 2204 is interchanged with the region 2205 in the first optical element of FIG. 22, interchanging the region 2301 with the region 2302 in the second optical element of FIG. 23, interchanging the region 2405 with the region 2406 in the third optical element of FIG. 24, and interchanging the pattern 2605 with the pattern 2606 in the fifth optical element of FIG. 26 ensures the similar function.

Example 8

In the example 8, specific values are calculated for the structure described in the above-described example 7.

The thickness of the substrate used in manufacturing each of the optical elements by the self-cloning method is set to 0.5 mm.

Figure 27:
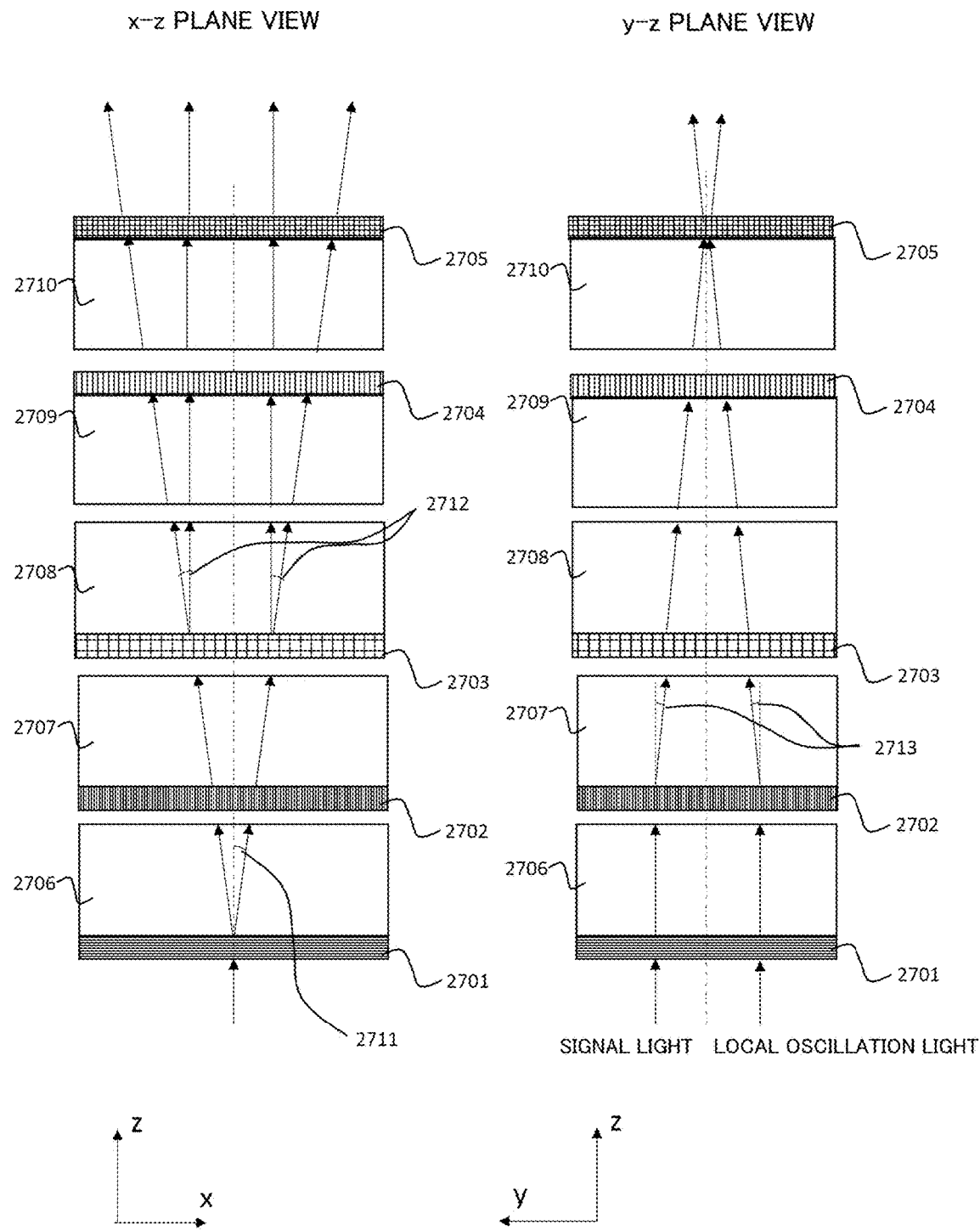
FIG. 27 is a drawing illustrating an arrangement of optical elements and optical paths according to an eighth embodiment.

The thickness of the multilayer film is ignored. When the optical elements are each arranged as FIG. 27, the length in the z-direction becomes 2.5 mm. The distance between the signal light and the local oscillation light is set to 0.5 mm assuming a common fiber array. A lens is installed to a distal end of the fiber array, and a collimated light beam is emitted. Note that FIG. 27 and FIG. 17 illustrate the respective optical elements to which substrates 2706, 2707, 2708, 2709, and 2710 are installed, and the patterns and the functions of the respective optical elements are same as those of FIG. 17.

Then, an angle 2713 with which the optical path is bent by a second optical element 2702 is as follows.

$$\tan^{-1}\left(\frac{0.25}{2000}\right) = 7.125[°]$$

Accordingly, assuming that the refractive index of the substrate is 1.46 and the wavelength is 1550 nm, the cycle of the second optical element 2702 is as follows.

$$\frac{1.55}{1.46 \sin(7.125[°])} = 8.56[\mu m]$$

Accordingly, a cycle of a fifth optical element 2705 becomes 4.31 [μm] as follows.

$$\frac{1.55}{1.46 \sin(14.25[°])} = 4.31[\mu m]$$

While a first optical element 2701 has any cycle, when it is assumed to be the cycle same as that of the second optical element 2702 and a third optical element 2703 is assumed to have a cycle 4.31 [μm] to ensure an angle double of it, the lights are to be emitted from four positions on the x-z plane at the positions of 125.0 [μm] and 496.6 [μm] from the center axis in each of the positive direction and the negative direction at the time point of the emission from the fifth element. The lights at the four positions are combinations of the lights in the two directions, and each separated after the emission. As a result, the eight light-beams are obtained.

The dimensions described above are merely examples, and in view of the expansion of the incident light in the structure, the design without overlapping with the next optical path is important.

Example 9

Figure 28:
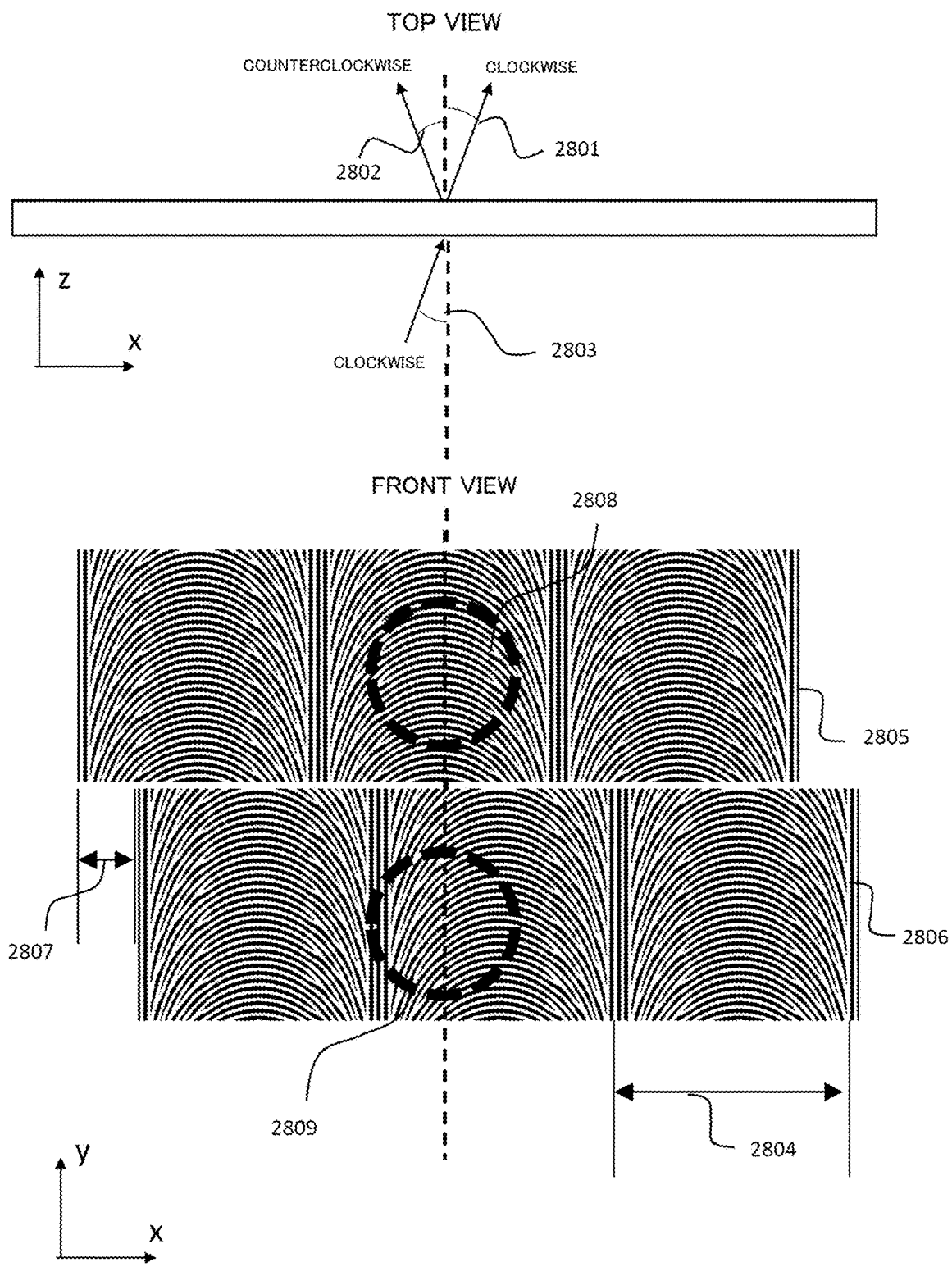
FIG. 28 is a drawing describing a ninth embodiment.

In this example, as illustrated in FIG. 28, the optical element of the example 1 is divided into two regions 2805 and 2806 in the y-direction, and assume that a cycle 2804 in the x-direction is D and a deviation amount 2807 in the x-direction of each pattern is ΔD. Assume that respective beams of different circular polarized lights enter a first incidence region 2808 and a second incidence region 2809, which have the same x-coordinate, of the first region 2805 and the second region 2806. The entered beam is, as a top view of FIG. 28, separated into a circular polarized light component 2801 that is an incident light 2803 directly traveling straight in the same light polarization state and a circular polarized light component 2802 that becomes to have a reverse direction and is bent. Since the component 2801 traveling straight is a component without the phase change from the structure of an optical element, the component 2801 is emitted with the wavefront from the incidence without change. When the phases of the entered two beams are equal, the beams are emitted as the phases are equal. The difference between them does not change.

Meanwhile, the bent component 2802 behaves differently. To the bent component, the phase change is given depending on the axis direction of the waveplate at the incidence position. In FIG. 28, since the phase change is given in accordance with the change of the x-coordinate in the same beam, the wavefront of the emitted beam is inclined in the X-Z plane and the emitted beam is bent in a direction different from that of the incident direction. Since the inclination of the wavefront in this case is determined by the change amount of the axis direction of the waveplate, it is equal in both cases of the first and the second incidence regions 2808 and 2809. That is, the beam travels in the same direction.

Meanwhile, the phase change is determined by the axis direction of the waveplate at the incidence position. To the beams entered to the first incidence region 2808 and the second incidence region 2809, the different phases are given regardless of the same x-coordinate because the axis direction at the part irradiated by the beam is different. Specifically, considering that the phase of the emitted light changes by $2\pi$ radians because the axis direction changes by $\pi$ radians in the one cycle 2804, when the axis direction is deviated by $\Delta D$, the phase is deviated by $\Delta D/D \times 2\pi$ radians. For example, when the deviation amount 2807 is ¼ of the one cycle 2804, a difference of the phase difference $\pi/2$ radians is generated between the beams emitted from the first incidence region 2808 and the second incidence region 2809. Note that the phase difference does not occur on the component traveling straight.

The use of this way of thinking ensures the function of separating the beam by the optical element 1502 and the optical element 1503 of FIG. 15, optical element 1603 and the optical element 1604 of FIG. 16, and the optical element 1703 and the optical element 1704 of FIG. 17 and giving the phase difference of 90 degrees to one optical path with one element. The details will be described in an example 10.

Example 10

Figure 29:
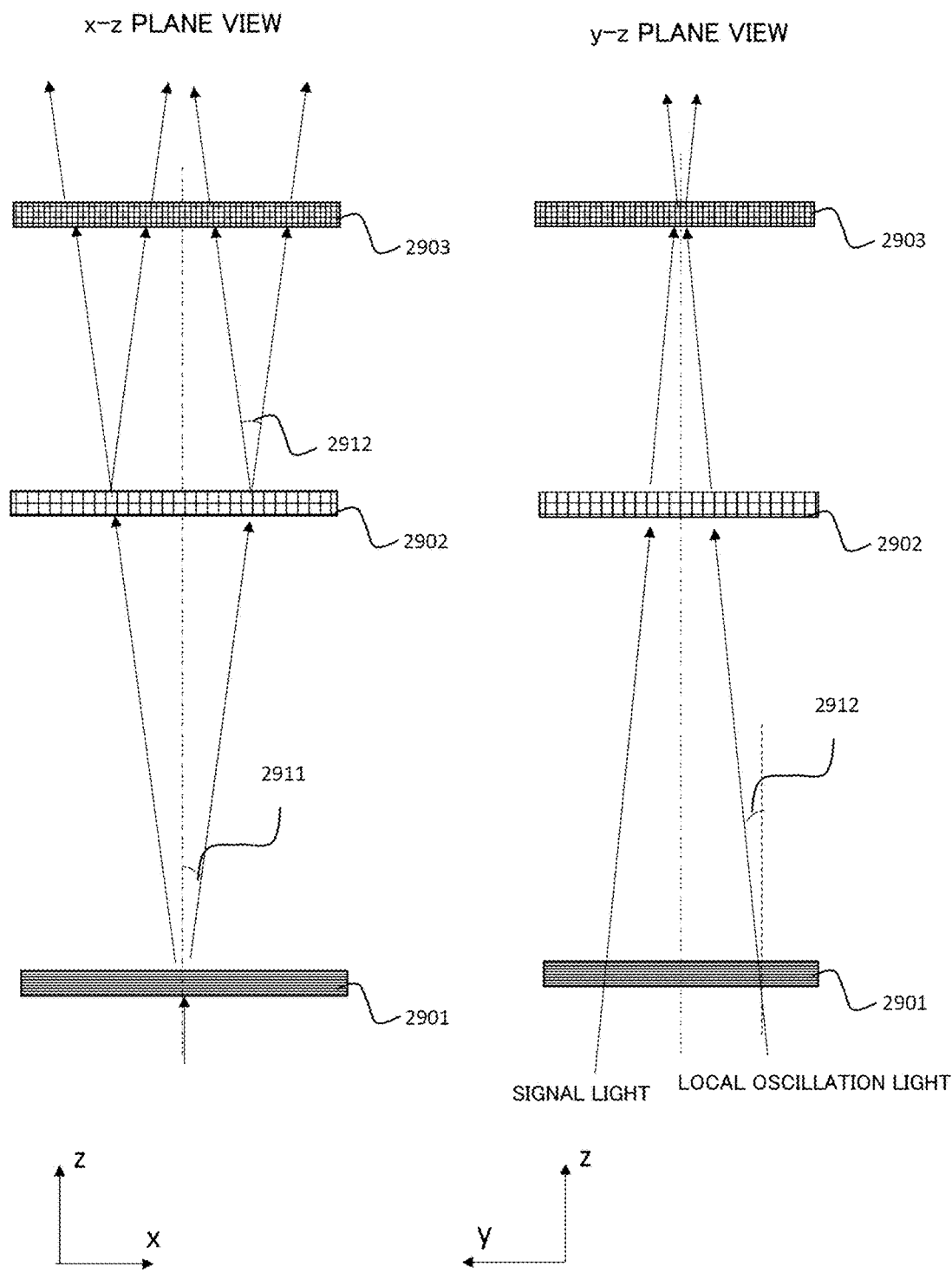
FIG. 29 is a drawing illustrating an arrangement of optical elements and optical paths according to a tenth embodiment.

First, FIG. 29 illustrates the entire configuration. Since the structure is three-dimensional, a cross section on the x-z plane and a cross section on the y-z plane are illustrated. The light travels in the +z-direction. While the elements are illustrated mutually separated in the drawing, they are actually fixed by an adhesive having a refractive index approximately equal to the refractive index of the substrate, and integrated.

Assume that the lights enter a first optical element 2901 at two positions aligned in the y-direction, and the signal light enters on the +y-side and the local oscillation light enters on the −y-side. Its pattern is different in direction between the upper and lower sides by 180 degrees as illustrated in the front view of FIG. 18, and the signal light enters a region 1804 on the upper side and the local oscillation light enters a region 1805 on the lower side.

Obviously, the inverse case may be employed. The local oscillation light to be entered is preferably a linear polarized light in a direction parallel or perpendicular to the y-axis. While the lights at the two positions have the incident positions different in the y-direction, the incident positions in the x-direction match.

The incident lights obliquely enter the multilayer film, and the incidence angles are adjusted so as to have the same position on a third optical element 2903.

Figure 30:
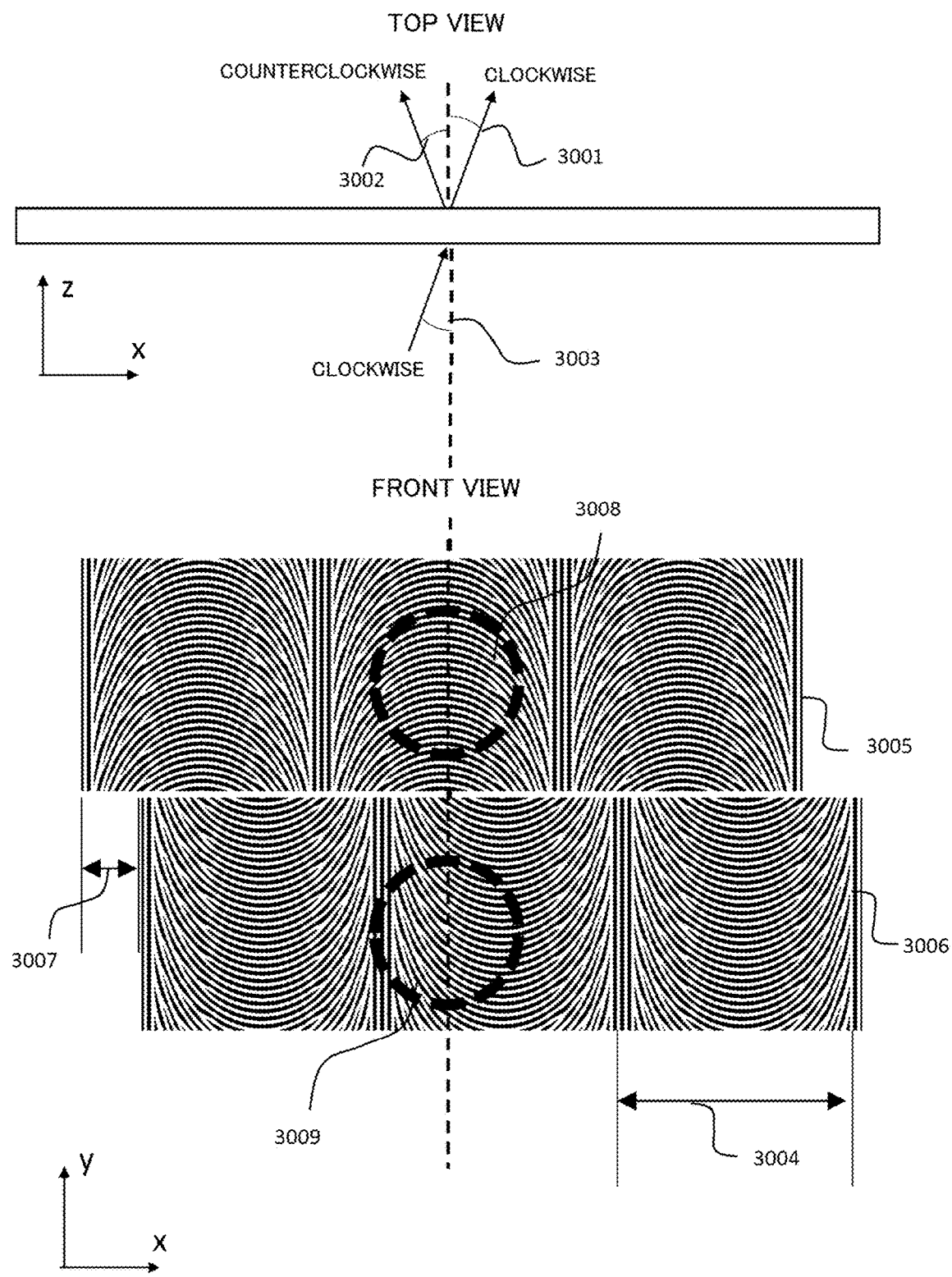
FIG. 30 is a drawing illustrating a pattern and a function of an optical element 2902 of FIG. 29.

Then, a second optical element 2902 is similar to the optical element of the example 9. The second optical element has the pattern illustrated in FIG. 30, and when its cycle 3004 is separated with an angle double of an angle 2911 generated at the first optical element 2901, the symmetry of the circuit is improved.

The second optical element separates each of the signal light and the local oscillation light to two as described in the examples, the light traveling straight has no phase difference generated between the signal light and the local oscillation light, and the phase difference of 90 degrees between the signal light and the local oscillation light is added to the bent light. In this case, it is important that a deviation amount 3007 is ¼ of the cycle 3004.

Then, the third optical element 2903 is basically a quarter waveplate similarly to the third optical element 1503 of the example 5.

Figure 31:
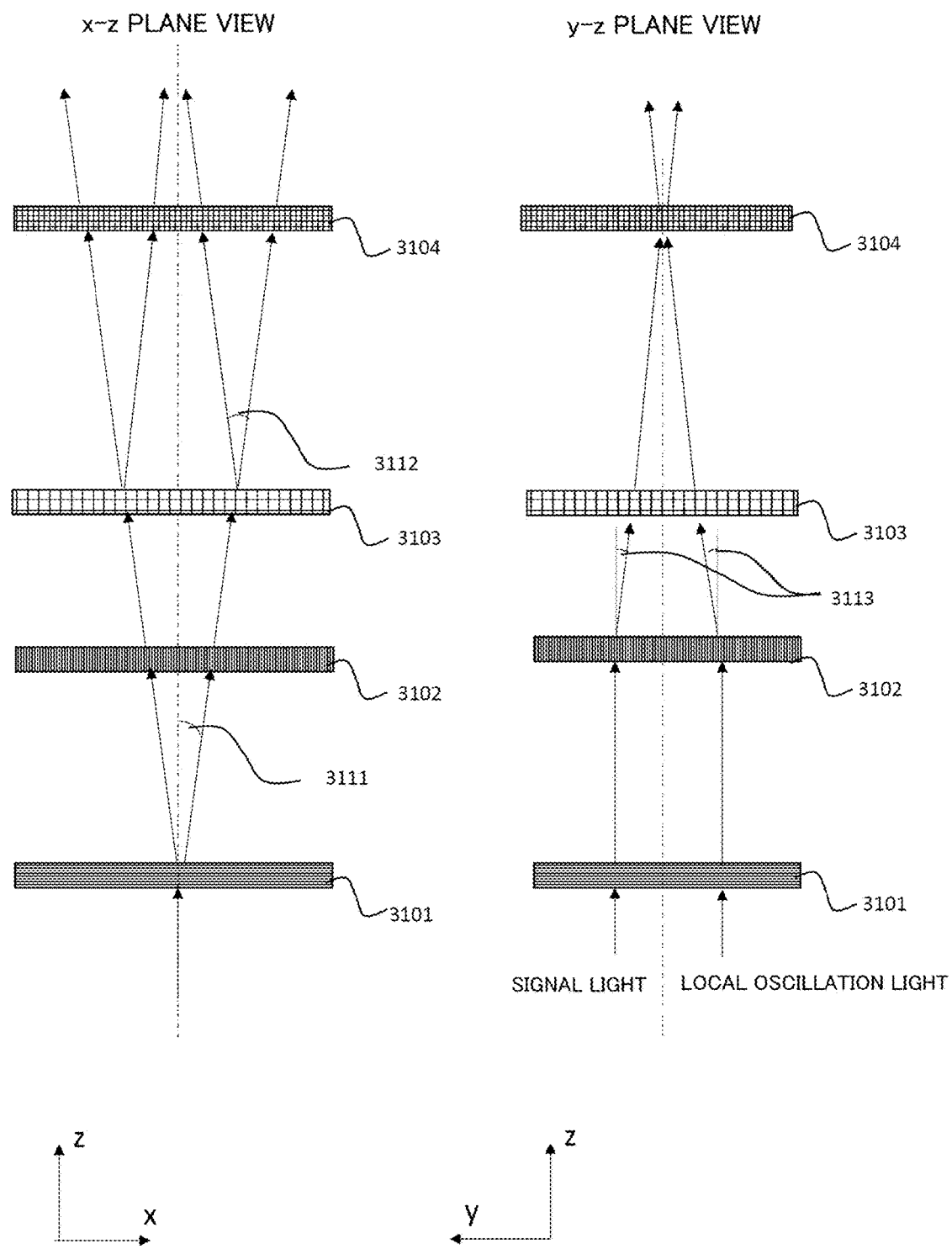
FIG. 31 is a drawing illustrating an arrangement of optical elements and optical paths according to an eleventh embodiment.
Figure 32:
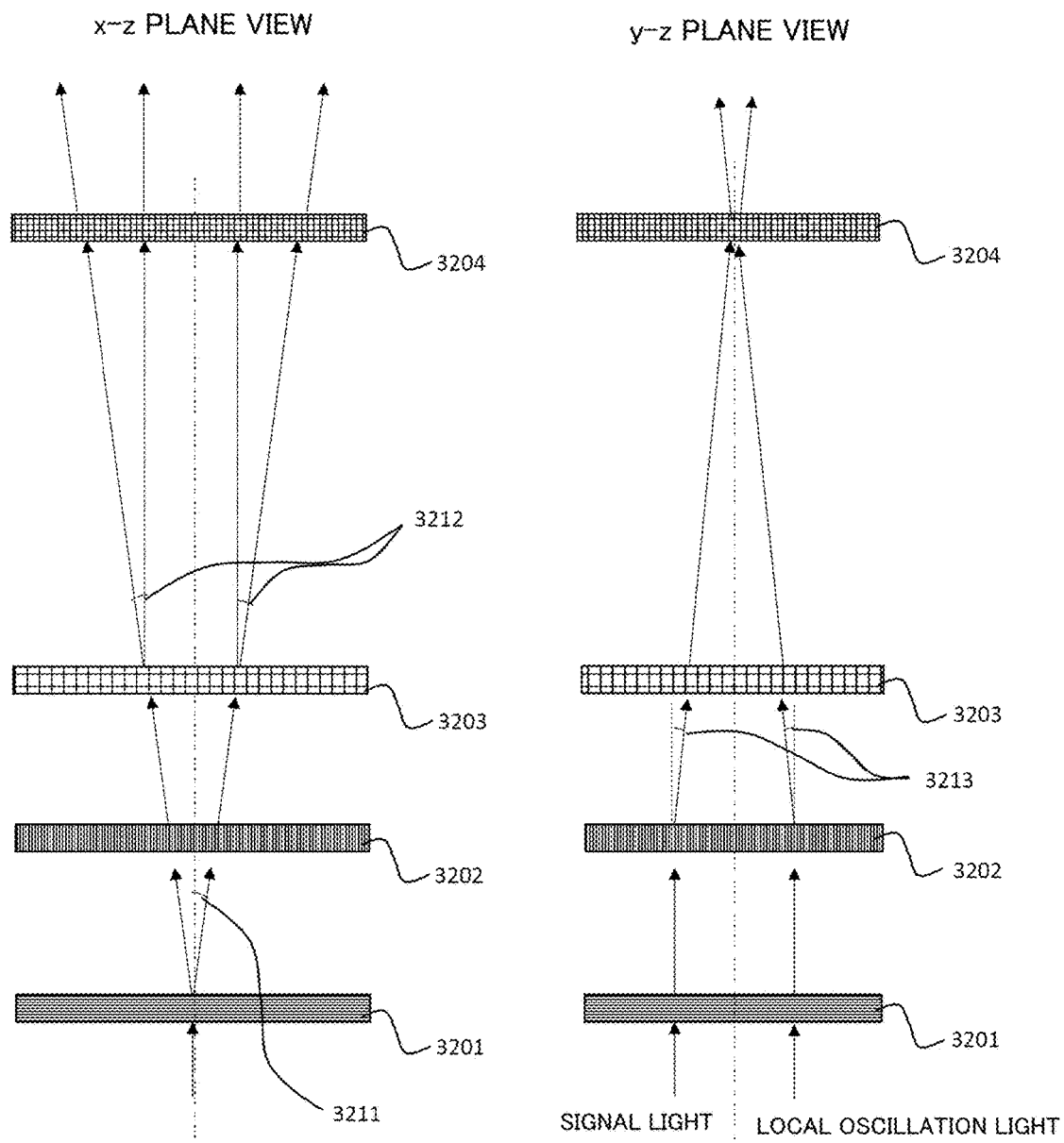
FIG. 32 is a drawing illustrating an arrangement of optical elements and optical paths according to a twelfth embodiment.

Similarly, this way of thinking is applied to the examples 6 and 7, thereby ensuring the reduction of the required number of the elements. FIGS. 31 and 32 illustrate the configurations. This indicates that the functions of the optical elements 1603 and 1604 or 1703 and 1704 are integrated into one optical element 3103 or 3203 applying the way of thinking of this example to the configurations of FIGS. 16 and 17. it is only necessary to appropriately select the direction of the pattern such that the beam is irradiated to the intended position.

Example 11

In the coherent optical communication, a 90-degree hybrid circuit is disposed for each polarized wave, a pair of the signal light and the local oscillation light that are mutually interfered and, on the other hand, a pair where the phase of the signal light or the local oscillation light is deviated by 90 degrees and interfered are output from there. After converting to electrical signals by an optical receiver for each channel, a difference is taken for each pair, thereby restoring the required signal component. Since the two beams aligned in the Y-direction on the same X-coordinate in FIGS. 15, 16, and 17 of the present invention correspond to the pair where the difference is taken, the optical receivers arranged in longitudinal two rows and lateral four rows on the XY plane are required.

Meanwhile, when the planar optical circuit in the prior art is used, the outputs are arranged in longitudinal one row and lateral eight rows. Accordingly, since the optical receivers and an electronic circuit following them are arranged corresponding to that, the present invention is not directly applicable to the same circuit. Therefore, rearrangement of the beams output in longitudinal two rows and lateral four rows is considered.

Figure 33:
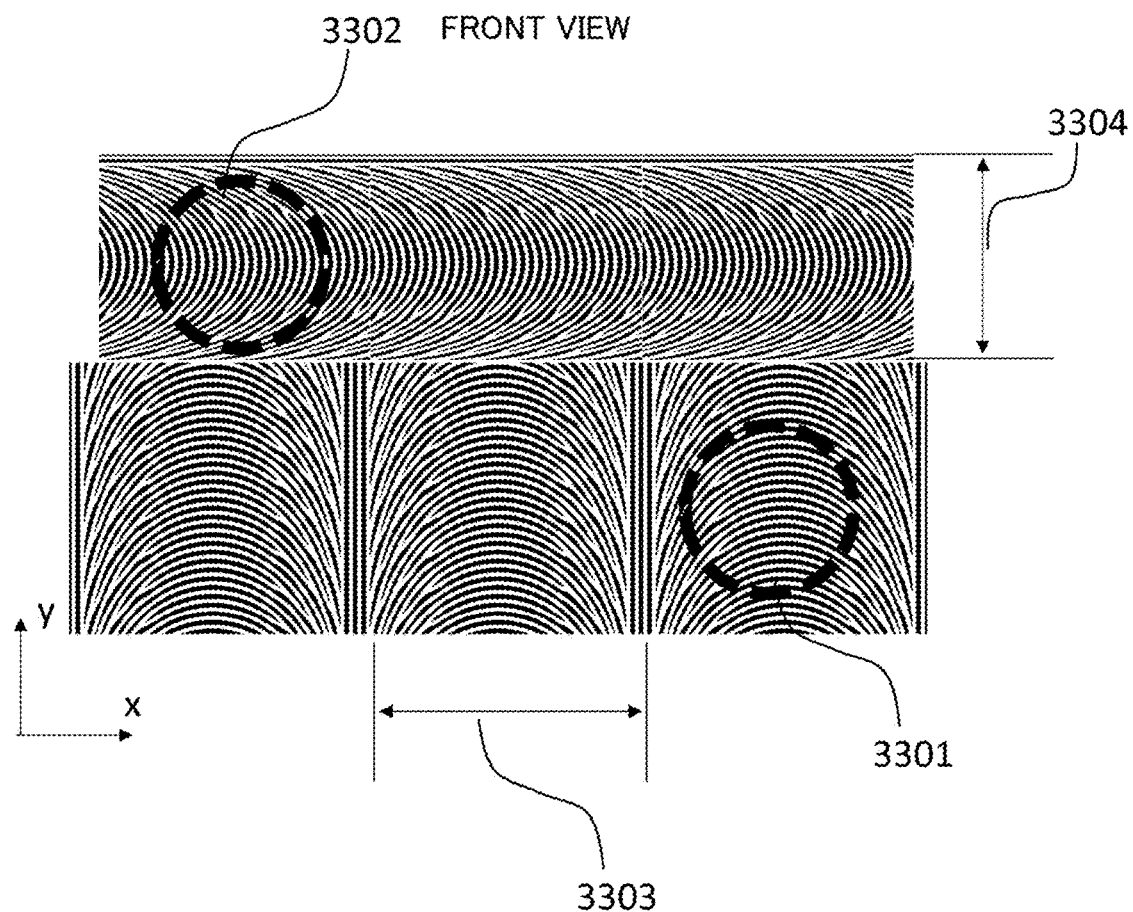
FIG. 33 is a drawing describing a control of a beam bending direction by incident positions of a thirteenth embodiment.
Figure 33:
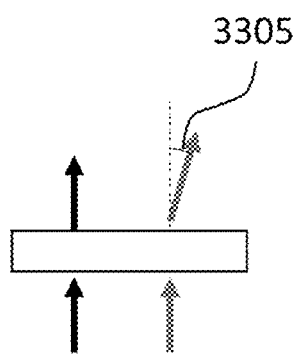
Figure 33:
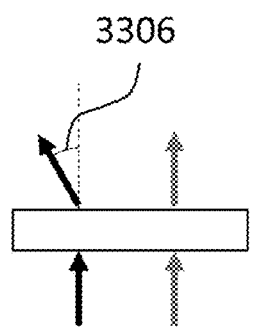
Figure 33:
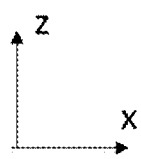
Figure 33:
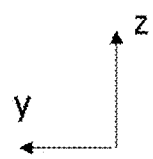

By using the way of thinking of FIG. 14, the light-beam can be freely guided to any point in the three-dimensional space. As illustrated in FIG. 14, when the phase difference of the prism used in the present invention is assumed to $\pi$ radians, the input circular polarized light is bent and output as a circular polarized light in a reverse direction. Since every beam output from a 90-degree hybrid unit of the present invention is the circular polarized light, the direction of the beam can be changed. Assume that, as FIG. 33, the waveplate has the patterns in different directions at different cycles in the plane, and the beams of the circular polarized light enter the respective patterns. The beam entering a first incidence region 3301 is bent in the xz-plane with an angle 3005. This angle is determined by a cycle 3303. Meanwhile, the beam entering a second incidence region 3302 is bent in the yz-plane with an angle 3306. The angle is determined by a cycle 3304. The directions and the cycles of the patterns can be set to various values. Accordingly, stacking a plurality of these elements ensures guiding the beam to any position while bending the beam.

Accordingly, by controlling the patterns of the prism at the respective positions of the beams entered with the arrangement of longitudinal two rows and lateral four rows, the traveling directions of the beams can be controlled, thus easily arranging the incident positions of the beams in one row on a plane apart from that plane by a distance. Note that in the rearrangement, the signals for taking the difference are preferably adjacent to one another, and the positive side and the negative side in taking the difference are preferably alternate like positive, negative, positive, negative, . . . for the configuration of the electronic circuit thereafter.

A description will be given by referring to FIG. 34. A first optical element 3401 is, for example, an optical element 3104 in FIG. 31, and the signal lights are interfered with the local oscillation lights, thereby outputting eight beams. Since the beams output from the first optical element 3401 are superimposed two by two in the y-direction, they are seen as four beams viewed from the +y-direction. Similarly, they are seen as two beams viewed from the x-direction. In contrast, a second optical element 3402 gives the angles to the respective beams such that the eight beams are irradiated to the same position on the y-coordinate at a third optical element 3403. Meanwhile, the beams are bent such that the beams entered to the second optical element 3402 on the same x-coordinate (different in y-coordinate) enter the third optical element 3403 on the different x-coordinates. Thus, the eight beams enter the third optical element 3403 to be aligned in one row in the x-direction on the same y-coordinate. The third optical element 3403 bends the beams so as to be each parallel to the z-axis. Thus, the eight beams aligned in one row can be obtained.

Figure 34:
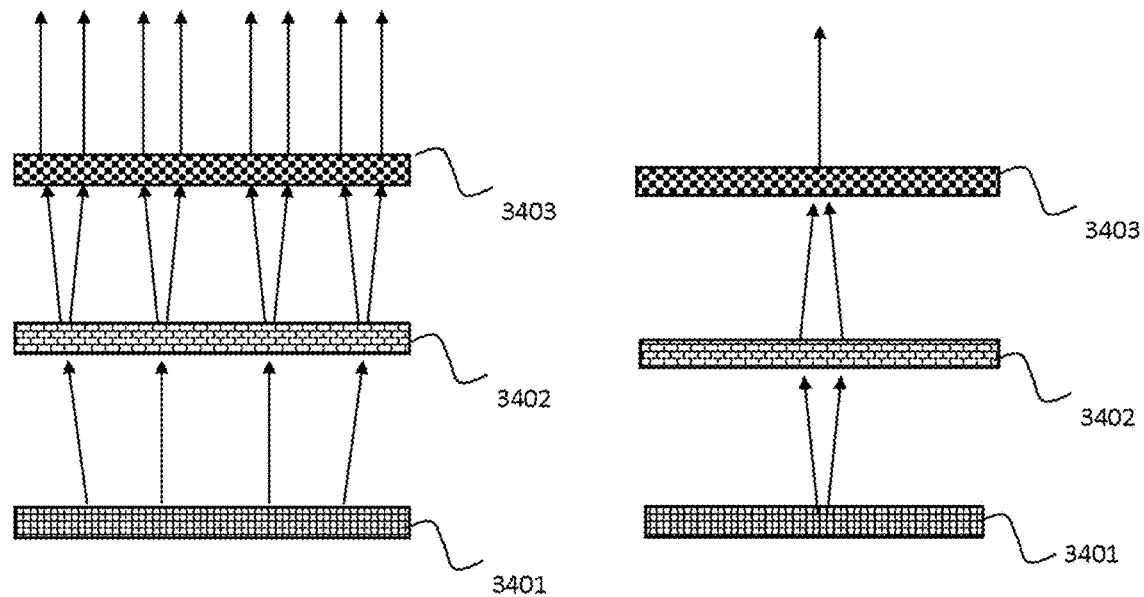
FIG. 34 is a drawing describing an example of rearrangement of the beams of the thirteenth embodiment.

The way of bending the beam is not the one in FIG. 34 alone, but various controls can be performed depending on the pattern of the element. The number of elements for bending the optical path is also not limited to two.

Example 12

In restoring the signal in the coherent optical communication, in consideration of S/N characteristics and the like of the optical receiver, the light power entering the optical receiver is often preferably controlled to a certain level. While the light power of the local oscillation light can be controlled, power of the signal light changes momently depending on the status of the communication path. Accordingly, a variable attenuator for keeping the light power of the signal light entering the optical receiver constant is preferably used.

Figure 35:
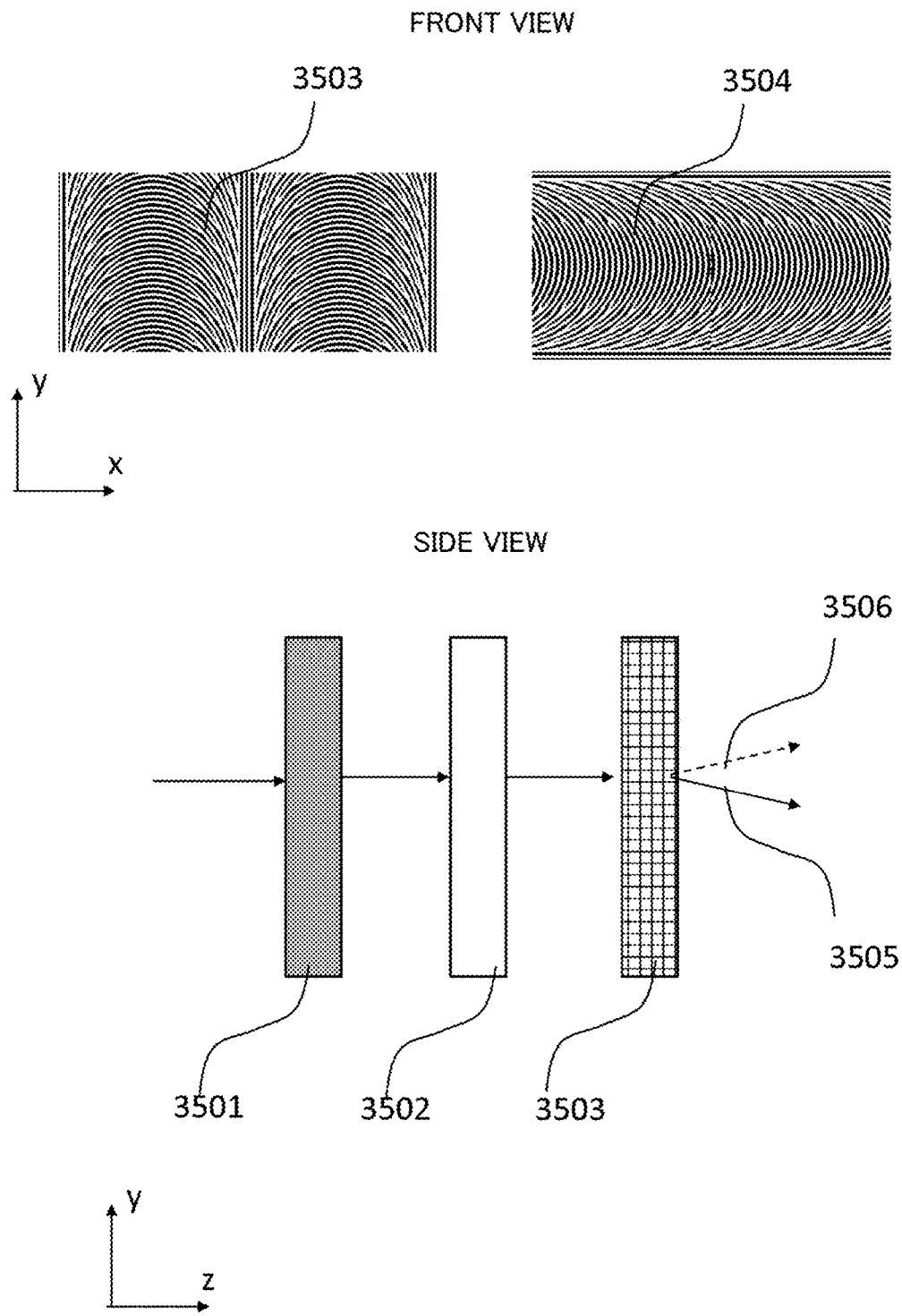
FIG. 35 is a drawing describing a principle to change an optical path by a liquid crystal of a fourteenth embodiment.

The basic principle of the variable attenuator using a liquid crystal will be described by referring to FIG. 35. A first optical element 3501 is a waveplate having a pattern indicated by a reference numeral 3504, and when a light enters, the light is separated into clockwise and counterclockwise circular polarized lights in the xz-plane. A side view of FIG. 35 illustrates a state of traveling of one of them viewed in the x-direction. The light emitted from the first optical element 3501 enters a liquid crystal variable retarder 3502 as a circular polarized light in a reverse direction.

Liquid crystal molecules are arranged to exhibit birefringence, and the retardation can be controlled by a voltage to be applied. When the circular polarized light is entered to the element having the birefringence, there is no change when the magnitude of the birefringence is 0. The circular polarized light is output as a linear polarized light when the magnitude of the birefringence is $\pi/2$ radians, and output as a circular polarized light in a reverse direction when the magnitude of the birefringence is n radians. The light polarization state between them also can be controlled by the voltage to be applied.

Here, the light polarization state changes depending on the voltage applied to the liquid crystal variable retarder 3502. Note that since any light polarization state can be expressed as a linear sum of the clockwise and the counterclockwise circular polarized lights, the change of the light polarization state can be considered as a change of a proportion of the clockwise circular polarized light and the counterclockwise circular polarized light. Accordingly, when the light whose light polarization state has changed enters a second optical element 3503, the component of the clockwise circular polarized light is bent in a first direction 3505, and the component of the counterclockwise circular polarized light is separated in a second direction 3506. The ratio is determined by the retardation of the liquid crystal variable retarder 3502. Note that since the circular polarized light enters the liquid crystal variable retarder 3502, the direction of the retardation may be any direction.

In the case of the configuration of the present invention, in the configurations of FIG. 16, FIG. 17, FIG. 31, and FIG. 32, the signal lights and the local oscillation lights transmitted through the first optical elements 1601, 1701, 3101, and 3201 are separated into the clockwise and the counterclockwise circular polarized lights. Here, the variable retarder using the liquid crystal is inserted only to the signal light.

Figure 36:
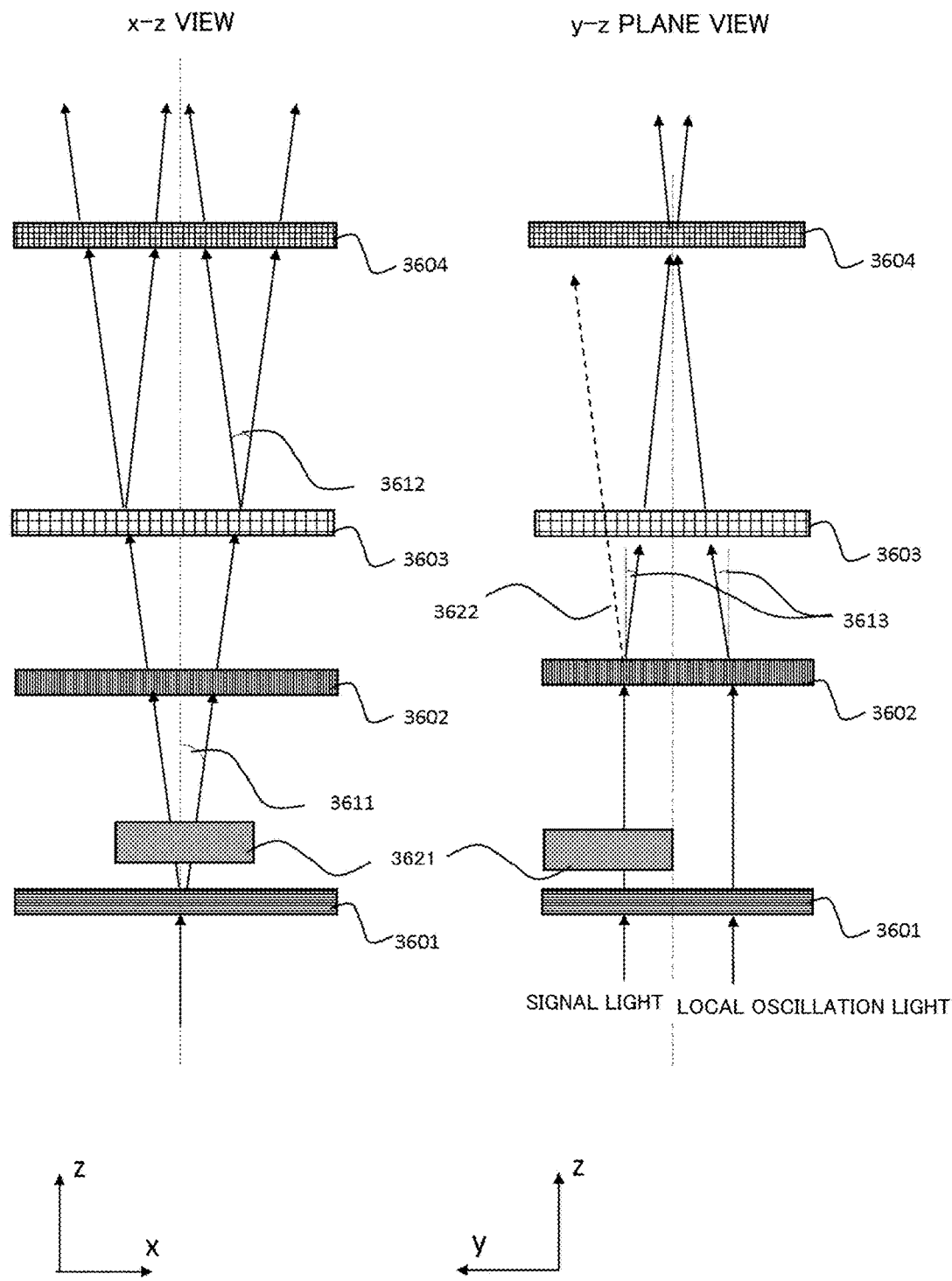
FIG. 36 is a drawing illustrating an example of the fourteenth embodiment where a liquid crystal element is introduced to the eleventh embodiment.

For example, a description will be given to a case where the variable retarder is inserted only to the signal light side immediately after the first optical element 3101 of FIG. 31, by referring to FIG. 36. A reference numeral 3621 indicates a liquid crystal retarder. As illustrated in y-z plane view, the liquid crystal retarder is inserted only to the optical path of the signal light.

Here, when the retardation of the variable retarder is 0, every input light has the optical path bent by a next second optical element 3602, and travels toward a point to be superimposed with the local oscillation light on a fourth optical element 3604. Here, in the case where the retardation of the variable retarder is $\theta$, when the light amount of each polarized light of the signal light input to the variable retarder is 1, the light amount of $\cos^2(\theta/2)$ travels toward the point to be superimposed with the local oscillation light on the fourth optical element 3604. The remaining component travels in a direction of a reference numeral 3622. In the case of $\theta=\pi/2$ radians, a half of the light amount travels to the point to be superimposed with the local oscillation light, and in the case of $\theta=\pi$ radians, the light does not travel to the point to be superimposed with the local oscillation light.

Thus, the light amount of the signal light toward a receiver can be variably controlled.

The same function can be achieved at similar position also in FIGS. 16, 17, and 32.

The liquid crystal variable retarder can be selected in various configurations for with or without voltage application and the magnitude of the retardation depending on the type of the liquid crystal molecule to be used and the orientation method. It is not that the present invention is ensured only by a specific configuration, but any configuration may be employed insofar as the retardation can be controlled. It is only necessary to use an appropriate element by observing the controllability, power consumption, and the like every time.

The variable retarder may be not only the liquid crystal but also the one using a photoelastic effect.

Example 13

Figure 3:
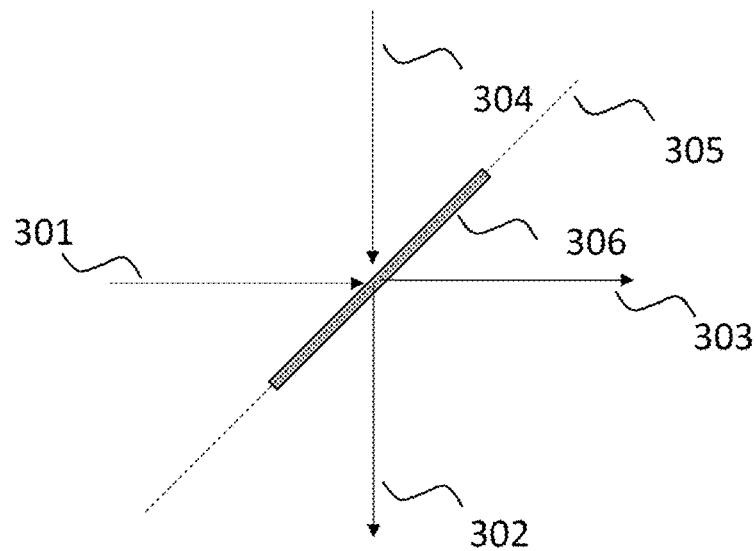
FIG. 3 is a drawing illustrating a light separation function of an optical element of the present invention.
Figure 4:
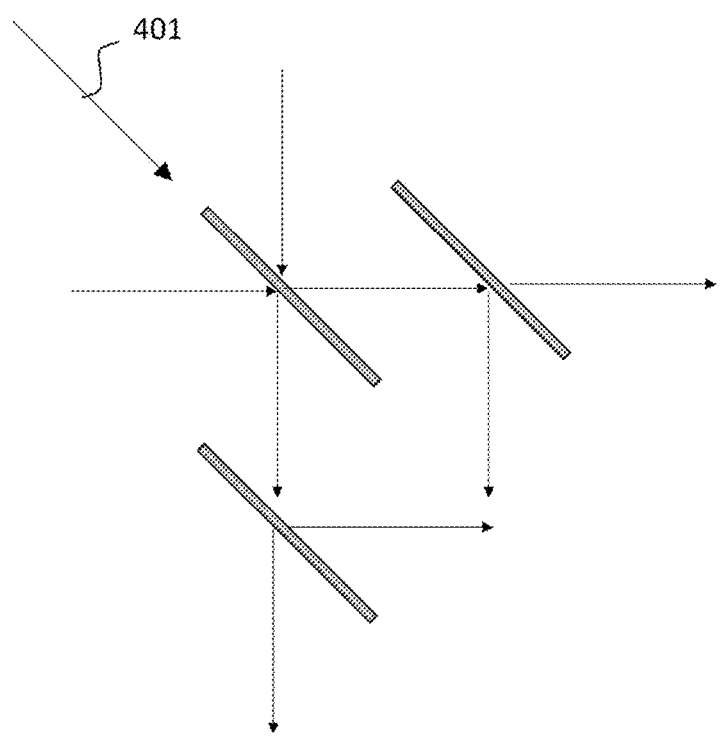
FIG. 4 is a drawing illustrating an optical circuit that ensures branching and synthesis by the half mirror of the prior art.
Figure 5:
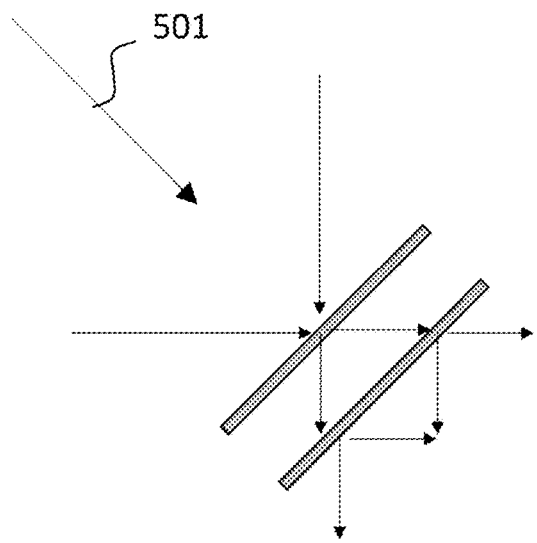
FIG. 5 is a drawing illustrating an optical circuit that ensures branching and synthesis by the optical element of the present invention.

For example, the use of the element described in the example 1 like FIG. 3 ensures providing the output lights 302, 303 where the input lights 301, 304 are interfered.

When the wavelengths (frequencies) of the input lights 301, 304 slightly differ, the output varies with a beat corresponding to the frequency difference.

Figure 37:
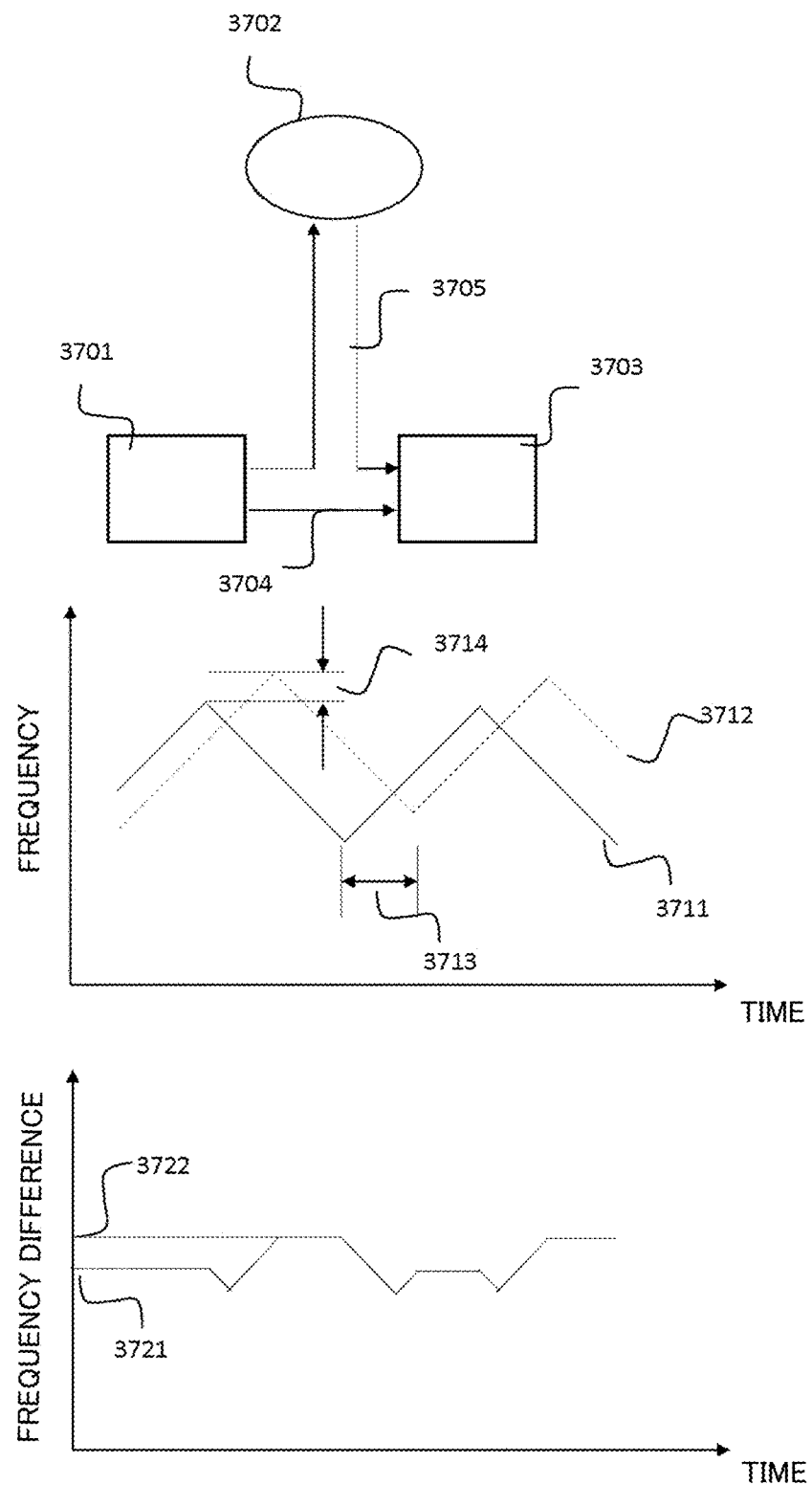
FIG. 37 is a drawing illustrating an example where the optical element according to the present invention is applied to a measuring instrument.

As illustrated in top of FIG. 37, two lights having the same wavelength are output from a light source 3701, one is irradiated to a measurement target 3702, and a light 3705 reflected by that returns and enters a measuring instrument 3703. The other light 3704 output from the light source 3701 directly enters the measuring instrument 3703. The measuring instrument 3703 internally has two input portions as illustrated in FIG. 3, and for example, the input light of the reference numeral 304 illustrated in FIG. 3 corresponds to the first input light 3705 illustrated in FIG. 37, and the input light of the reference numeral 301 illustrated in FIG. 3 corresponds to the second input light 3704 illustrated in FIG. 37. Note that, as described above, the two lights entered to the optical element 306 of the present invention are each separated into the optical paths 302, 303, and interfere with one another.

In such an optical system, a frequency modulation is applied to the lights output from the light source 3701. As illustrated in FIG. 37, the frequency is changed in, for example, a triangular-wave shape in accordance with time. When the modulation state of the optical path 3704 is indicated by a reference numeral 3711 and the modulation state of the optical path 3705 is indicated by a reference numeral 3712, a difference between optical path lengths of 3704, 3705 causes a time difference 3713. As a result, interference of the two lights causes the beat. The distance is proportionate to the frequency of the beat.

Meanwhile, when the measurement target 3702 moves, its speed causes the modulation frequency to be influenced by Doppler shift, thereby generating a frequency difference 3714.

The frequency difference (beat) obtained by the interference is illustrated in the bottom of FIG. 37. When the measurement target does not move, 3721 matches 3722. In the moving, a difference is generated as the drawing.

Accordingly, an average value $f_{avg}$ of the reference numeral 3721 and the reference numeral 3722 is proportionate to the distance, and a difference $f_{sub}$ between the reference numeral 3721 and the reference numeral 3722 is proportionate to the speed. When the speed of the light is c, a change amount of the frequency per second is $\Delta f$, and the frequency of the light is f0, a distance r to the measurement target and its speed v are obtained from the following formulas.

$$r = c \div 2 \times \Delta f \times f_{avg}$$

$$v = c \div 4 \times f0 \times f_{sub}$$

This is a common technique of a radar, referred to as a Frequency Modulated Continuous Wave (FM-CW: frequency modulated continuous wave) radar, using a radio wave.

While the basis is the interference circuit as illustrated in FIG. 3, when the light polarization state of the input light is unknown, the interference may be performed after the polarization separation by disposing the element 2901 of FIG. 29, and the optical path also can be freely controlled using the technique of the present invention.

The invention claimed is:

1. An optical element comprising
a waveplate formed in an xy-plane in a three-dimensional space x, y, z, the waveplate having a phase difference θ, and θ not being an integral multiple of π radians, wherein
a single strip-shaped region is disposed or a plurality of strip-shaped regions are repeated in an x-axis direction, and the region is parallel to a y-axis direction and has a width D,
the region having the width D is divided into a plurality of strip-shaped sub regions parallel to the y-axis,
an axis direction of the waveplate has:
   an angle with respect to the y-axis direction that changes step by step in a range of 0 degrees to 180 degrees in the region; and
   the angle with respect to the y-axis direction that is uniform in the sub region,
an angle β of a slow-wave axis of the sub region with respect to the x-axis is indicated by β=(180×x1/D) [degree], that is clockwise with respect to an x-coordinate x1 of a center line of the sub region, and
a circular polarized light entering from a −z-direction toward a +z-direction is separated and converted into
   a component that is a circular polarized light of a rotation in a reverse direction to the incident circular polarized light and bent in a +x-direction in an xz-plane and a component that is a circular polarized light of a rotation in a same direction as the incident circular polarized light and travels straight
   with a power ratio $\sin^2(\theta/2):\cos^2(\theta/2)$, and
   the components are emitted.

2. An optical element comprising
a waveplate formed in an xy-plane in a three-dimensional space x, y, z, the waveplate having a phase difference θ, and θ not being an integral multiple of π radians, wherein
a single strip-shaped region is disposed or a plurality of strip-shaped regions are repeated in an x-axis direction, and the region is parallel to a y-axis direction and has a width D,
the waveplate has an axis direction as a curved line that matches a curved line y=(D/π)log(| cos(πx/D)|)+constant in a range of a discretization error, and
a circular polarized light entering from a −z-direction toward a +z-direction is separated and converted into
   a component that is a circular polarized light of a rotation in a reverse direction to the incident circular polarized light and bent in a +x-direction in an xz-plane and a component that is a circular polarized light of a rotation in a same direction as the incident circular polarized light and travels straight
   with a power ratio $\sin^2(\theta/2):\cos^2(\theta/2)$, and
   the components are emitted.

3. The optical element according to claim 1 or claim 2, wherein
the waveplate is a quarter waveplate, and
the circular polarized light entering from the −z-direction toward the +z-direction is separated and converted into the bent component and the component travelling straight with the equal power, and the components are emitted.

4. The optical element according to claim 2, wherein
a geometric arrangement is made such that one of mutually adjacent projecting portion and depressed portion is branched and joined so as to have a ratio of a maximum value to a minimum value of an interval of the other in the region within double.

5. The optical element according to claim 1 or claim 2, wherein
the waveplates include photonic crystals laminated in a z-axis direction, the photonic crystal has a unit cycle between grooves of 40 nm or more and ¼ or less of a wavelength of the incident light, and the photonic crystal has a cycle in a thickness direction of ¼ or less of the wavelength of the incident light.

6. An optical circuit comprising a plurality of planes ($xy_1$, $xy_2$, ... $xy_N$) through which a light is transmitted in a z-direction, the plurality of planes ($xy_1$, $xy_2$, ... $xy_N$) being perpendicular to the light transmission direction, wherein the first plane ($xy_1$) includes n intersection points (n is an integer of 1 or more), at least any one plane among the second and following planes ($xy_2$, ... $xy_N$) includes the optical element according to claim 1 or claim 2 that has a plurality of axis directions, and at least one of the light-beams entering the respective intersection points of the first plane passes through the optical element disposed on the second plane to the N-th plane (N is an integer of 1 or more), and polarized lights at m intersection points (m is an integer of 1 or more) that have passed through the N-th plane each have a complex amplitude as a first-order linear sum of complex amplitudes of respective polarized lights of the light-beams entering the respective intersection points of the first plane.

7. The optical circuit according to claim 6, wherein the optical element and an element that is the optical element having the phase difference of an integral multiple of π radians are disposed such that predetermined circular polarized lights or linear polarized lights are obtained at a plurality of points of a final plane by performing separation of different kinds of the circular polarized light, branching one circular polarized light-beam into two optical paths, and joining and redistribution of the different kinds of the circular polarized light.

8. The optical circuit according to claim 7, wherein the optical element and the element that is the optical element having the phase difference of the integral multiple of π radians are disposed such that two light polarization states and two phases (0 degrees, 90 degrees) of the signal light are obtained on the final plane by performing separation of different kinds of the circular polarized light, branching one circular polarized light-beam into two optical paths, and joining and redistribution of the different kinds of the circular polarized light, and a 90-degree hybrid circuit is synthesized with a polarized light separator, the polarized light separator being configured to obtain eight lights in total corresponding to sum signals of and difference signals between the local oscillation light and the signal light.

9. The optical circuit according to claim 8, wherein the optical element that branches the circular polarized light into the two optical paths includes a plurality of regions in an XY-plane, the regions are each divided into strip-shaped regions having widths D extending in a y-direction, single or a plurality of the strip-shaped regions are disposed in an x-direction, and an axis direction of a waveplate changes from 0 degrees to 180 degrees along the x-direction in the strip-shaped region, distances in the X-direction in portions corresponding to the axis direction of 0 degrees in respective regions including the strip-shaped regions in the XY-plane are mutually different by ΔD (0<ΔD<D) from an integral multiple of the width D, and components of the circular polarized lights entered into the respective strip-shaped regions include the elements emitted to be mutually deviated in phase by ΔD/D×2π radians, and the components are emitted as circular polarized lights in a reverse direction by the optical element.

10. The optical circuit according to claim 8 or claim 9, wherein eight beams are arrangeable at any positions of a plane by inserting a plurality of the optical elements having the phase differences of the integral multiple of π radians so as to have an individual direction of a pattern to each of the eight beams to individually change the directions of the respective output eight beams, and the optical circuit has a polarization separation function and a 90-degree hybrid function.

11. The optical circuit according to any of claim 8 to claim 10, comprising an element disposed immediately after a portion through which a signal light of a first optical element passes, the element being configured to control a retardation of a birefringence variably with an electrical signal, wherein a light polarization state of the signal light is controlled by the element to generate a component that travels toward an optical receiver and a component without traveling by a second optical element, and a light amount of the signal light toward the optical receiver is controlled by a retardation amount of a liquid crystal, and the optical circuit has a polarization separation function and a 90-degree hybrid function.

12. A phase difference measuring instrument that uses the optical element according to claim 1 or claim 2 to measure a phase difference between two input lights, one of the two input lights as a reference light and the other as a signal light.

13. An instrument configured to use the phase difference measuring instrument according to claim 12 to measure a distance to an object and a speed having one of lights separated from a light source as a reference light and the other irradiated to the object to have a reflected light from the object as a signal light, or an measuring instrument that has a function to mechanically or electrically operate the light irradiated to the object to detect a position and a speed of the object in a three-dimensional space.

* * * * *